US008041456B1

(12) United States Patent
Blackwell et al.

(10) Patent No.: US 8,041,456 B1
(45) Date of Patent: Oct. 18, 2011

(54) SELF-BALANCING ROBOT INCLUDING AN ULTRACAPACITOR POWER SOURCE

(75) Inventors: Trevor Blackwell, Mountain View, CA (US); Daniel Casner, Sunnyvale, CA (US); Benjamin Nelson, Mountain View, CA (US); Scott Wiley, Los Altos, CA (US)

(73) Assignee: Anybots, Inc., Mountain View, CA (US)

( * ) Notice: Subject to any disclaimer, the term of this patent is extended or adjusted under 35 U.S.C. 154(b) by 245 days.

(21) Appl. No.: 12/255,816

(22) Filed: Oct. 22, 2008

(51) Int. Cl.
*G06F 19/00* (2011.01)
(52) U.S. Cl. .................. 700/245; 318/568.12; 901/1
(58) Field of Classification Search .......... 700/250, 700/256, 254, 245; 318/568.12, 568.22, 318/568.24; 901/49, 50
See application file for complete search history.

(56) References Cited

U.S. PATENT DOCUMENTS

| 3,739,252 | A | * | 6/1973 | Hays et al. ..................... 318/696 |
| 4,620,831 | A | | 11/1986 | Poncet |
| 4,693,666 | A | | 9/1987 | Garin |
| 4,697,472 | A | | 10/1987 | Hiyane |
| 5,255,753 | A | | 10/1993 | Nishikawa et al. |
| 5,271,292 | A | | 12/1993 | Sawada et al. |
| 5,323,867 | A | | 6/1994 | Griffin et al. |
| 5,341,083 | A | * | 8/1994 | Klontz et al. ................. 320/109 |
| 5,445,235 | A | | 8/1995 | Gomi et al. |
| 5,534,761 | A | | 7/1996 | Crippa |
| 5,640,883 | A | | 6/1997 | Takizawa |
| 5,682,795 | A | | 11/1997 | Solomon et al. |
| 5,778,730 | A | | 7/1998 | Solomon et al. |
| 5,929,538 | A | * | 7/1999 | O'Sullivan et al. ............ 307/66 |
| 6,002,525 | A | | 12/1999 | Poulo et al. |
| 6,094,189 | A | | 7/2000 | Quillen et al. |
| 6,095,023 | A | | 8/2000 | Harada et al. |
| 6,229,278 | B1 | * | 5/2001 | Garces et al. ................. 318/801 |
| 6,324,934 | B1 | | 12/2001 | Monaghan |
| 6,338,013 | B1 | * | 1/2002 | Ruffner ........................ 701/23 |
| 6,346,962 | B1 | | 2/2002 | Goodridge |
| 6,472,839 | B1 | | 10/2002 | Ishii et al. |
| 6,526,807 | B1 | * | 3/2003 | Doumit et al. ............. 73/40.5 R |
| 6,553,271 | B1 | | 4/2003 | Morrell |

(Continued)

FOREIGN PATENT DOCUMENTS

DE 3825136 A 1/1990

(Continued)

OTHER PUBLICATIONS

Maxwell Technologies 48 Volt Energy Module Overview, Oct. 15, 2006 (http://web.archive.org/web/*/http://www.maxwell.com/ultracapacitors/products/modules/bmod0083-48-6v.asp).

(Continued)

*Primary Examiner* — Thomas Black
*Assistant Examiner* — Shardul Patel
(74) *Attorney, Agent, or Firm* — Peters Verny, LLP

(57) ABSTRACT

A power system is provided for robotic systems such as dynamically balancing robots, including inverted pendulum robots, robots that balance on two legs, and dynamically balancing robotic personal vehicles. Under normal operation, the power system provides operating power from a power source such as an internal battery system or an external AC power supply. The power system includes an energy storage device, such as an ultracapacitor assembly, that can provide emergency power sufficient to power components of the robotic system to a stable shutdown configuration in the event of a deleterious power event.

27 Claims, 11 Drawing Sheets

U.S. PATENT DOCUMENTS

| | | | |
|---|---|---|---|
| 6,640,160 B2 | 10/2003 | Takahashi et al. | |
| 6,682,020 B2 | 1/2004 | Janson | |
| 6,711,293 B1 | 3/2004 | Lowe | |
| 6,888,333 B2 | 5/2005 | Laby | |
| 6,925,115 B1* | 8/2005 | Andersen et al. | 375/238 |
| 6,925,357 B2 | 8/2005 | Wang et al. | |
| 7,082,350 B2* | 7/2006 | Skoog | 700/245 |
| 7,085,112 B2 | 8/2006 | Wilk et al. | |
| 7,142,945 B2 | 11/2006 | Wang et al. | |
| 7,142,947 B2 | 11/2006 | Wang et al. | |
| 7,158,859 B2 | 1/2007 | Wang et al. | |
| 7,158,860 B2 | 1/2007 | Wang et al. | |
| 7,158,861 B2 | 1/2007 | Wang et al. | |
| 7,161,322 B2 | 1/2007 | Wang et al. | |
| 7,164,969 B2 | 1/2007 | Wang et al. | |
| 7,164,970 B2 | 1/2007 | Wang et al. | |
| 7,171,286 B2 | 1/2007 | Wang et al. | |
| 7,200,482 B2* | 4/2007 | Kawarasaki | 701/97 |
| 7,218,992 B2 | 5/2007 | Wang et al. | |
| 7,222,000 B2 | 5/2007 | Wang et al. | |
| 7,240,747 B2 | 7/2007 | Miyazaki et al. | |
| 7,262,573 B2 | 8/2007 | Wang et al. | |
| 7,289,883 B2 | 10/2007 | Wang et al. | |
| 7,370,713 B1* | 5/2008 | Kamen | 180/7.1 |
| 7,481,291 B2 | 1/2009 | Nishikawa | |
| 7,492,115 B2 | 2/2009 | Gomi | |
| 7,593,030 B2 | 9/2009 | Wang et al. | |
| 7,677,345 B2 | 3/2010 | Hosoda | |
| 7,761,185 B2 | 7/2010 | Wang et al. | |
| 7,769,492 B2 | 8/2010 | Wang et al. | |
| 2002/0006327 A1 | 1/2002 | Stuyt | |
| 2006/0066730 A1 | 3/2006 | Evans, Jr. et al. | |
| 2006/0076039 A1 | 4/2006 | Song et al. | |
| 2006/0093915 A1* | 5/2006 | Lundquist et al. | 429/231.8 |
| 2006/0243499 A1 | 11/2006 | Hosoda | |
| 2007/0017855 A1 | 1/2007 | Pippin | |
| 2007/0164693 A1* | 7/2007 | King et al. | 318/109 |
| 2007/0192910 A1* | 8/2007 | Vu et al. | 901/17 |
| 2007/0206247 A1 | 9/2007 | Kaplan | |
| 2007/0229018 A1* | 10/2007 | Mitchell et al. | 318/650 |
| 2008/0029536 A1 | 2/2008 | Wang et al. | |
| 2008/0037306 A1* | 2/2008 | Marhefka et al. | 363/149 |
| 2008/0105481 A1* | 5/2008 | Hutcheson et al. | 180/209 |
| 2008/0173493 A1* | 7/2008 | Adachi | 180/218 |
| 2008/0212154 A1 | 9/2008 | Feinsod et al. | |
| 2008/0231222 A1 | 9/2008 | Hashimoto et al. | |
| 2008/0231233 A1* | 9/2008 | Thornton | 320/137 |
| 2008/0253958 A1* | 10/2008 | McCracken et al. | 423/609 |
| 2009/0105881 A1 | 4/2009 | Wang et al. | |
| 2009/0105882 A1 | 4/2009 | Wang et al. | |
| 2009/0125147 A1 | 5/2009 | Wang et al. | |
| 2009/0281829 A1 | 11/2009 | Hansen et al. | |
| 2010/0070079 A1 | 3/2010 | Mangaser et al. | |
| 2010/0131103 A1 | 5/2010 | Herzog et al. | |

FOREIGN PATENT DOCUMENTS

| | | |
|---|---|---|
| JP | 08318483 A | 12/1996 |

OTHER PUBLICATIONS

"Mbari Rov," Mellinger, E. Oceans apos;93. apos;Engineering in Harmony with Oceanapos;. Proceedings, Oct. 18-21, 1993 pp. II/152-II/157 vol. 23 (downloaded from http://web.archive.org/web/20040826075512/http://www.mbari.org/staff/meed/powerpaper/pwrpaper.htm).

Anderson, David P., nBot Balancing Robot, Dec. 12, 2002 (http://web.archive.org/web/20021212193018/http://www.geology.smu.edu/~dpa-www/robo/nbot/).

Segway, Aug. 27, 2007 (http://web.archive.org/web/20070827083934/http://www.segway.com/).

Eden, Ashley, et al. "Seamless Image Stitching of Scenes with Large Motions and Exposure Differences", Computer Vision and Pattern Recognition, 2006 IEEE Computer Society Conference on, 2006, vol. 2, pp. 2498-2505.

Seitz, Steven M. and Dyer, Charles R., "View Morphing," SIGGRAPH '96 Proceedings of the 23rd annual conference on Computer graphics and interactive techniques, 1996.

Zhang, Zhengyou, "A Flexible New Technique for Camera Calibration," Technical Report MSR-TR-98-71, Microsoft Corporation, Aug. 13, 2008.

Gene F. Franklin et al., "Feedback Control of Dynamic Systems," Prentice Hall, pp. 184-190, 2005.

U.S. Appl. No. 12/242,532, Trevor Blackwell, Self-Balancing Robot including Flexible Waist, filed Sep. 30, 2008.

U.S. Appl. No. 12/258,268, Trevor Blackwell, Remotely Controlled Self-Balancing Robot Including Kinematic Image Stabilization, filed Oct. 24, 2008.

U.S. Appl. No. 12/350,063, Trevor Blackwell, Robot Including Electrically Activated Joints, filed Jan. 7, 2009.

U.S. Appl. No. 12/277,872, Trevor Blackwell, Remotely Controlled Self-Balancing Robot including a Stabilized Laser Pointer, filed Nov. 25, 2008.

U.S. Appl. No. 12/781,702, Scott Wiley, Self-Balancing Robot having a Shaft-Mounted Head, filed May 17, 2010.

U.S. Appl. No. 12/350,063 non-final Office action, mailed Jul. 14, 2011.

* cited by examiner

SELF-BALANCING ROBOT INCLUDING AN ULTRACAPACITOR POWER SOURCE

CROSS-REFERENCE TO RELATED APPLICATIONS

This application is related to U.S. patent application Ser. No. 12/242,532 filed on Sep. 30, 2008 and entitled "Self-Balancing Robot including Flexible Waist," which is incorporated herein by reference.

BACKGROUND OF THE INVENTION

1. Field of the Invention

The present invention relates generally to the field of robotics and more particularly to mobile self-balancing robots.

2. Related Art

Telepresence refers to the remote operation of a robotic system through the use of a human interface. Telepresence allows an operator of the robotic system to perceive aspects of the environment in which the robotic system is located, without having to physically be in that environment. Telepresence has been used, for example, by doctors to perform medical operations without being present in the operating room with the patient, or by military personnel to inspect a bomb.

Robotic systems that provide telepresence capabilities are either fixed in a particular location, or provide a degree of mobility. Of those that provide mobility, however, the forms tend to be close to the ground and built on wide platforms with three or more legs or wheels for stability. These systems, in short, lack a generally upright human form, and accordingly, an operator cannot perceive the remote environment from a natural upright perspective with the normal range of motion one would have if actually present in the remote environment.

Some two-wheeled self-balancing robotic systems have been developed in recent years. One such system is controlled by a human rider. Absent the rider, the system merely seeks to keep itself in an upright position with a feedback loop that senses any tilting from this upright position and rotates the two wheels to restore the upright position. A user standing on the system may control movement by leaning back and forth. This causes a tilt away from the upright position, which is interpreted as a command to move in the direction of the tilt.

One concern with self-balancing robots pertains to safety during power disruptions. Power disruptions include the sudden loss of power, such as when a power cord is cut, a loss of sufficient power, such as when a battery system runs low transient power spikes, and the like. Power disruptions can cause the robot to lose balance and damage itself, damage other property, and cause injury to people. Most power disruptions occur without warning. In the case of battery systems, it can be difficult to estimate the available energy that a battery system will be able to produce, and therefore the battery system may run low without warning.

SUMMARY

An exemplary robotic system comprises a base, a leg segment extending from the base, and a torso segment pivotally coupled to the leg segment by a waist joint. The base is supported on wheels and includes at least one motor configured to drive the wheels. The exemplary robotic system also comprises a first actuator, such as a pneumatic cylinder, configured to change a waist angle defined between the leg segment and the torso segment, a first control system configured to maintain balance of the robotic system on the wheels, and a second control system configured to change a base angle responsive to changing the waist angle. Here, the base angle is defined between a first reference plane having a fixed relationship to the base and a second reference plane having a fixed relationship to an external frame of reference. In some embodiments, a width of the base as measured along an axis of the wheels is less than half of a height of the robotic system when the waist angle is about 180°. It will be understood that maintaining balance is a dynamic process whereby a metastable state is actively maintained over no more than two points of contact between the robotic system and the surface on which it is supported to prevent the robotic system from falling over.

Embodiments of the exemplary robotic system can further comprise a head pivotally attached to the torso segment. In some of these embodiments, the robotic system further comprises logic configured to maintain a fixed orientation of the head, relative to an external frame of reference, while changing the waist angle. Additional embodiments further comprise a lean joint disposed between the leg segment and the base. Here, the lean joint can be configured to tilt the leg segment relative to the base around an axis that is approximately perpendicular to an axis of rotation of the waist joint. Some of these embodiments further comprise a second actuator configured to move the leg segment relative to the base around the lean joint. Also, some embodiments that include the lean joint further comprise a stabilizer configured to restore the leg segment to an orientation perpendicular to the base. Various embodiments of the exemplary robotic system can further include a tether, and in some of these embodiments the robotic system further comprises an actuated tail extending from the base and configured to move the tether out of the way of the wheels.

In various embodiments, the waist angle can vary within a range of about 180° to at least less than about 90°, and wherein longitudinal axes of the torso and leg segments are approximately collinear when the waist angle is about 180° so that the robotic system can bring the head proximate to the ground and/or achieve a sitting posture. Also in various embodiments, the robotic system can transition from the sitting posture, in which the robotic system is supported on both wheels and a third point of contact with the ground, and a human-like upright posture balanced on the wheels. For purposes of tailoring the center of gravity of the robotic system, such as a battery system, in some embodiments a power source configured to provide power to the at least one motor is disposed within the torso segment. The center of gravity of the combined body segments above the waist joint, such as the torso segment and head, can be further than half their overall length from the waist joint, in some embodiments.

In various embodiments the first control system comprises a feedback loop that includes a balance sensor, such as a gyroscope, and balance maintaining logic. In these embodiments the balance maintaining logic receives a balance signal from the balance sensor and is configured to drive the wheels of the robotic system to maintain the balance of the robotic system. In various embodiments the second control system comprises base angle determining logic configured to receive a waist angle input, determine a new base angle from the waist angle input, and provide the new base angle to the balance maintaining logic.

Another exemplary robotic system comprises a robot and a human interface in communication with the robot. Here, the robot comprises a self-propelled base, a leg segment extending from the base, a torso segment pivotally coupled to the leg segment by a waist joint, an actuator configured to change a waist angle defined between the leg segment and the torso segment, and base angle determining logic configured to determine a base angle from a waist angle input. The actuator is configured to change the waist angle responsive to a movement control input.

The human interface comprises a position sensor configured to take a measurement of an angle made between a first reference axis having a fixed relationship to the position sensor and a second reference axis having a fixed relationship to an external frame of reference. The human interface also comprises a controller configured to receive the measurement and communicate the movement control input to the actuator of the robot. The human interface, in some embodiments, further comprises a joystick for controlling a position of the robot.

Some embodiments of the exemplary robotic system further comprise logic configured to determine the waist angle input from the movement control input and provide the waist angle input to the base angle determining logic. Still other embodiments of the exemplary robotic system further comprise a control system configured to change the base angle while changing the waist angle, the base angle being defined between a first reference plane having a fixed relationship to the base and a second reference plane having a fixed relationship to an external frame of reference.

An exemplary method of the invention comprises maintaining balance of a robot on two wheels, the wheels disposed on opposite sides of a base of the robot, and maintaining the robot at an approximate location while bending the robot at a waist joint, the waist joint pivotally joining a torso segment to a leg segment extending from the base. In these embodiments, balance is maintained by measuring a change in a base angle of the robot, and rotating the wheels to correct for the change so that the wheels stay approximately centered beneath the center of gravity of the robot. Here, the base angle is defined between a first reference plane having a fixed relationship to the base and a second reference plane having a fixed relationship to an external frame of reference. Maintaining the robot at the approximate location while bending the robot at the waist joint comprises changing a base angle while changing a waist angle such that the wheels do not appreciably rotate. Here, the waist angle is defined between the torso segment and the leg segment and while changing the waist angle. Changing the base angle can include, for example, determining a target base angle from a target waist angle. In some embodiments, the method further comprises receiving a target waist angle. Changing the waist angle can include, in some embodiments, receiving a target waist angle from a sensor configured to measure an orientation of a torso of a person. In those embodiments where the robot includes a head, methods can further comprise changing an orientation of the head of the robot while changing the waist angle, or maintaining a fixed orientation of the head of the robot while changing the waist angle. In those embodiments that include changing the orientation of the head, changing the orientation of the head can comprise monitoring an orientation of a head of a person, in some embodiments.

The robotic systems of the invention may be tethered or untethered, operator controlled, autonomous, or semi-autonomous.

Still another exemplary robotic system comprises a base, at least one motor, a lower segment attached to the base, an upper segment pivotally attached to the lower segment at a waist, a balance sensor configured to sense an angle of the base relative to a horizontal plane, and balance maintaining logic configured to maintain the balance of the base responsive to the sensed angle of the base by providing a control signal to the at least one motor. The robotic system also comprises a position sensor configured to detect a position of the base, and movement logic configured to maintain the base at a preferred position responsive to the detected position of the base. The robotic system further comprises a waist angle sensor configured to detect a waist angle between the lower segment and the upper segment, and a base angle calculator configured to calculate a base angle responsive to the detected waist angle, the base angle being calculated to approximately maintain a center of gravity of the system.

Another exemplary method comprises receiving a base angle of a base from a balance sensor and receiving a waist angle from a waist sensor. Here, the waist angle is an angle between an upper segment and a lower segment, the upper segment is pivotally coupled to the lower segment, and the lower segment is supported by the base. The method also comprises receiving a position of the base by monitoring rotation of a wheel supporting the base, calculating a first preferred angle of the base responsive to the received waist angle, and using a difference between the received position of the base and a desired position of the base, and the received base angle to balance the base at approximately the first preferred angle. The method can further comprise receiving an adjustment to the first preferred position of the base from a user input. In various embodiments, the method further comprises receiving a desired waist angle from a user input, changing the waist angle to the desired waist angle, calculating a second preferred angle of the base responsive to the changed waist angle, and balancing the base at approximately the second preferred angle.

Still another exemplary robotic system comprises a base, a leg segment extending from the base, and a torso segment pivotally coupled to the leg segment by a waist joint. The base is supported on wheels and includes at least one motor configured to drive the wheels. The exemplary robotic system also comprises an actuator configured to change a waist angle defined between the leg segment and the torso segment, a first control system configured to maintain balance of the robotic system on the wheels, and a second control system configured to change the waist angle responsive to changing a base angle. Here, the base angle is defined between a first reference plane having a fixed relationship to the base and a second reference plane having a fixed relationship to an external frame of reference.

An exemplary robotic system comprises a dynamically balancing robot, for example, one that balances on two wheels. The robot includes an electrically activated component, such as a motor, that is employed when the robot is brought to a stable shutdown configuration. The robotic system also comprises a power system configured to power the component. The power system includes a voltage converter configured to receive power from a power source, an energy storage device in electrical communication between the voltage converter and the component, and a controller. Here, the energy storage device is capable of providing the component with sufficient power to bring the robot to the stable shutdown configuration during a deleterious power event. An exemplary energy storage device comprises an ultracapacitor assembly. In some embodiments the energy storage device is characterized by a power density of at least 1000 W/kg and/or an energy density of at least 1 Wh/kg.

The controller of the exemplary system is configured to monitor for an indication of the deleterious power event. In various embodiments, the controller monitors the power source, the energy storage device, or both for the indication of the deleterious power event. In some instances, the controller is further configured to regulate the current and voltage applied by the voltage converter to the energy storage device. In additional embodiments, the system further comprises safe shutdown logic configured to control the component through a series of safe shutdown steps to achieve the stable shutdown configuration. In still other embodiments, the controller is further configured to supply power to the component from the power source and the energy storage device in parallel.

In some embodiments, the robotic system further comprises a DC power source, where the voltage converter is in electrical communication between the DC power source and the energy storage device. The voltage converter can also comprise an AC to DC converter for those embodiments where the power source is an AC power source.

In some embodiments one or more components coupled to the power system are also capable of producing power, and in these embodiments the exemplary robotic system can further comprise means for dissipating excess energy. For instance, the controller can be further configured to dissipate excess energy through a shunt circuit, or by adding an oscillation to a drive voltage applied to a motor. In some embodiments where the power source comprises a DC power source, the system further can comprise a second voltage converter configured to recharge the DC power source.

Another exemplary robotic system comprises a motor, a DC power source, an ultracapacitor assembly, and a voltage converter in electrical communication between the DC power source and the ultracapacitor assembly. The voltage converter is configured to apply a current and voltage to the ultracapacitor assembly from the DC power source. The robotic system further comprises a motor driver in electrical communication between the motor and the ultracapacitor assembly, and a controller configured to monitor the DC power source for an indication of a deleterious power event. In some embodiments, the ultracapacitor assembly is capable of providing the motor with sufficient power to bring the robotic system to a stable shutdown configuration during the deleterious power event. These robotic systems can comprise, for example, inverted pendulum robots.

The robotic system, in some embodiments, further comprising a leg segment and a torso segment pivotally coupled together by a waist joint, and the DC power source is disposed within the torso segment. In additional embodiments, the controller is further configured to dissipate excess energy by adding an oscillation to a drive voltage applied by the motor driver to the motor. The controller can be further configured to receive a maximum current from the DC power source, and in some of these embodiments the controller is configured to regulate the current drawn by the voltage converter to not exceed the maximum current. The controller can also be configured to regulate the voltage applied to the ultracapacitor assembly within a range bounded by a voltage rating of the ultracapacitor assembly. The controller can also be configured to modify an operational limit of the robotic system, such as the maximum speed, when the ultracapacitor assembly has been depleted to at least a threshold.

An exemplary method comprises balancing a robot on no more than two points of contact with the ground, and responding to a deleterious power event by transitioning the robot to a stable shutdown configuration while drawing power from an ultracapacitor assembly. Here, balancing the robot comprises drawing power from a power source. The method can further comprise, in some embodiments, monitoring the power source for an indication of the deleterious power event. The deleterious power event, in various embodiments, can comprise a loss of power or a low battery condition where the available power remaining in a battery system is insufficient to transition the robot to the stable shutdown configuration. The robot in these embodiments can comprise, for example, a dynamically balancing robotic personal vehicle. The robot may also be configured to dynamically balance on two legs.

Another exemplary method comprises balancing a robot on no more than two points of contact with the ground, the robot including an ultracapacitor assembly characterized by a maximum charge voltage, and drawing power in parallel from both a power source and from the ultracapacitor assembly. Here, balancing the robot includes drawing power from the power source, the power source is characterized by a safe discharge rate, and the power drawn from the power source is limited by the safe discharge rate. In some embodiments, the method further comprises monitoring the charge voltage of the ultracapacitor assembly. Some of these embodiments further comprise modifying an operational limit of the robot, such as a maximum speed, responsive to the charge voltage of the ultracapacitor assembly. Likewise, some of these embodiments further comprise modifying the operational limit of the robot when the charge voltage of the ultracapacitor assembly becomes depleted to at least a threshold, such as half of the maximum.

DETAILED DESCRIPTION OF THE INVENTION

The present invention is directed to mobile self-balancing robots characterized by a generally human-like upright posture. These robots are human-like in that they are capable of bending at a waist and include control systems for maintaining balance, for maintaining a fixed location while bending at the waist, and for changing the location and the orientation of the robot. The mobility, ability to bend at the waist, and upright posture make the robots of the present invention suitable for telepresence and other applications. The present invention is additionally directed to robotic systems that allow a person to remotely control a robot through a human interface. Methods of the present invention are directed to maintaining the balance of the robot at a fixed location while executing a bend at the waist, and in some embodiments additionally moving a head of the robot while bending at the waist. These methods optionally also include steps in which a person controls the bending at the waist, head movements, movements of arms, and/or controls other aspects of the robot through a human interface.

Figures 1, 2:
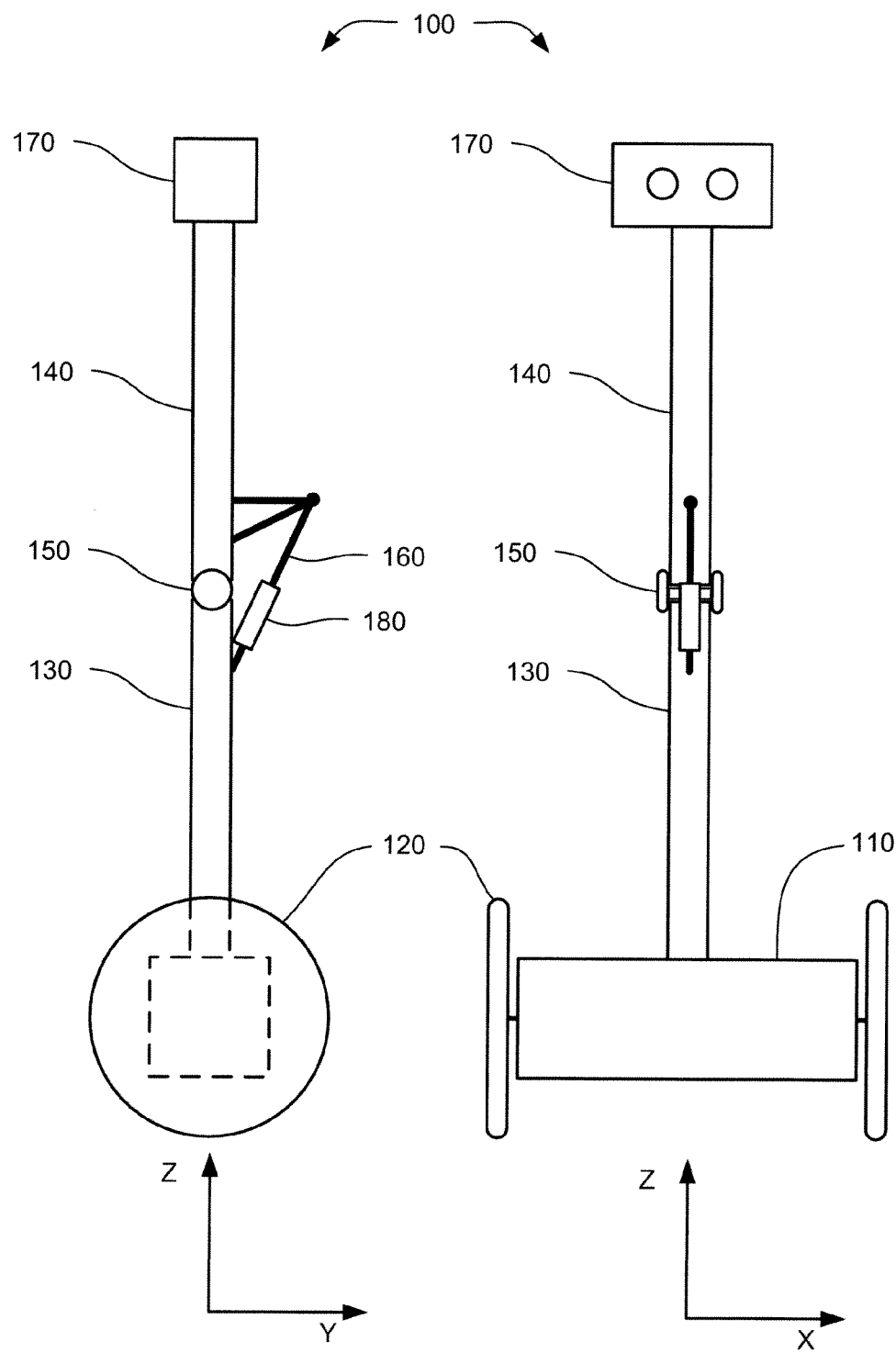
FIGS. 1 and 2 show side and front views, respectively, of a mobile self-balancing robot according to an embodiment of the present invention.

FIGS. 1 and 2 show side and front views, respectively, of a mobile self-balancing robot 100 according to an embodiment of the present invention. The robot 100 has a generally human-like upright posture and the ability to bend at a midpoint in a manner analogous to a person bending at the waist. The robot 100 comprises a self-propelled base 110 supported on wheels 120 and including a motor (not shown) configured to drive the wheels 120. Wheels 120 optionally consist of one or two wheels. In some embodiments, the width of the base 110 as measured along the axis of the wheels 120 is less than half of the height of the robot 100 when the robot 100 is in a fully upright configuration. Dynamically balancing robots, such as robot 100, are sometimes referred to as inverted pendulum robots.

The robot 100 also comprises a lower segment pivotally coupled to an upper segment at a waist. In the given example, the lower segment comprises a leg segment 130 extending from the base 110, and the upper segment comprises a torso segment 140 coupled to the leg segment 130 by a waist joint 150. The robot 100 further comprises an actuator 160 configured to bend the robot 100 at the waist joint 150. The ability to bend at the waist joint 150 allows the robot 100 to sit down and get up again, in some embodiments, as discussed below with respect to FIG. 10.

In various embodiments, the torso segment 140, the leg segment 130, or both, include one or more communication components. One example of a communication component is a communication port, such as a Universal Serial Bus (USB) port, to allow a person to connect a computing system to the robot 100. Another example of a communication component is a video display screen. The video display screen can permit a remote operator to display information, graphics, video, and so forth to those near the robot 100. In some embodiments, the video display screen includes a touch screen to allow input from those near the robot 100.

The robot 100 optionally also includes ahead 170 attached to the torso segment 140. In some embodiments, the head 170 is disposed at the end of the torso segment 140 that is opposite the end of the torso segment 140 that is joined to the waist joint 150, as shown in FIGS. 1 and 2. In additional embodiments, the head 170 is pivotally attached to the torso segment 140, as discussed in greater detail below with respect to FIG. 7. The ability of the robot 100 to bend at the waist joint 150 allows the head 170 to be moved through a range of motion that in some embodiments can bring the head 170 close to the ground.

The head 170 can include instrumentation, such as sensors, cameras, microphones, speakers, a laser pointer, and/or the like, though it will be appreciated that such instrumentation is not limited to the head 170 and can also be disposed elsewhere on the robot 100. for instance, the laser pointer can be disposed on an arm or finger of the robot 100. The head 170 can include one or more illuminators to illuminate the environment. Illuminators can be provided to produce colored illumination such as red, green, and blue, white illumination, and infrared illumination, for instance. Some embodiments also include a laser to serve as a pointer, for example, that can be controlled by a remote operator.

In further embodiments, the robot 100 comprises a lean joint (not shown) that couples the leg segment 130 to the base 110. The lean joint is described in greater detail with respect to FIG. 8. In still other embodiments, the robot 100 includes one or more arms (not shown) extending from the torso segment 140 and/or the leg segment 130. The arms can include a human-like hand and/or a pneumatically driven gripper or other end effectors. As discussed in greater detail below, control of the motion of the robot 100 can be autonomous, through a human interface, or through the human interface with some autonomous capabilities.

FIGS. 1 and 2 also illustrate a coordinate axis system defined relative to the robot 100. As can be seen in FIGS. 1 and 2, a Z-axis, also termed a vertical axis, is disposed parallel to the Earth's gravitational axis. When the robot 100 is at rest and balanced on the wheels 120, the center of gravity of the robot 100 lies along the vertical axis, e.g. is centered above the wheels. It will be appreciated that when the robot 100 is travelling forward or backward, the center of gravity will be either forward of, or behind, the vertical axis. When the robot 100 is on a level surface and at rest, the vertical axis passes through a midpoint between the centers of wheels 120.

FIG. 1 also shows a Y-axis perpendicular to the Z-axis. The Y-axis, also termed a horizontal axis, is aligned with the direction of travel of the robot 100 when both wheels 120 are driven together in the same direction and at the same rate. FIG. 2 shows an X-axis, also termed a transverse axis, which is perpendicular to both the Z-axis and the Y-axis. The transverse axis runs parallel to a line defined through the centers of the wheels 120. The frame of reference defined by this coordinate system moves with the robot 100 and is termed the internal frame of reference. Another frame of reference, termed the external frame of reference, is fixed relative to the environment around the robot 100.

Figure 3:
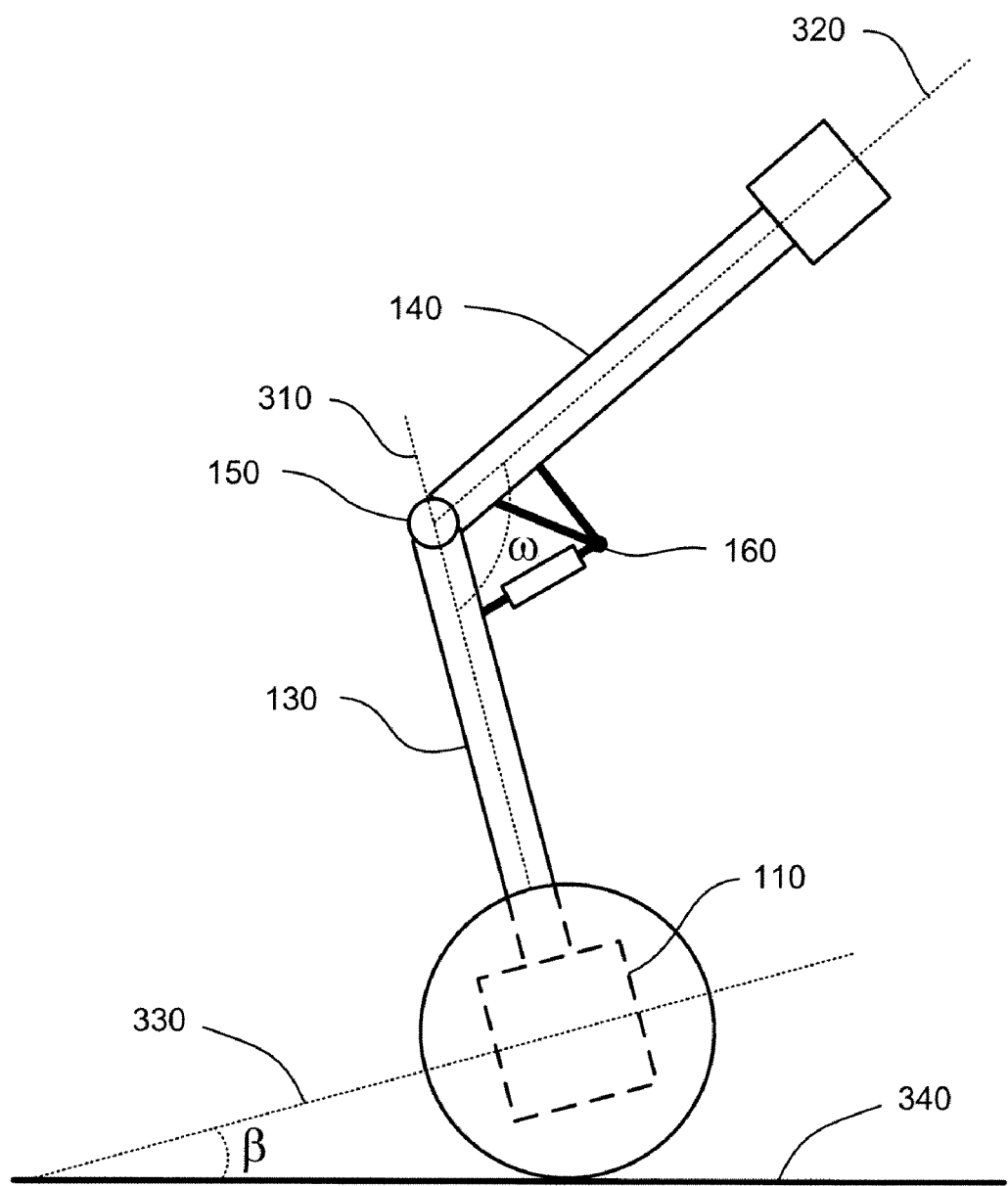
FIG. 3 shows a side view of the robot of FIGS. 1 and 2 bent at a waist joint according to an embodiment of the present invention.

FIG. 3 shows a side view of the robot 100 bent at the waist joint 150, according to an embodiment of the present invention. As illustrated in FIG. 3, a waist angle, ω, is defined between the leg segment 130 and the torso segment 140 at the waist joint 150, and the actuator 160 is configured to change the waist angle. More specifically, the waist angle is defined as an angle between a longitudinal axis 310 of the leg segment 130 and a longitudinal axis 320 of the torso segment 140. Another angle, termed a base angle, β, that may be defined between a base reference plane 330 of the base 110 and the horizontal plane 340. Depending on the orientation of the base 100, the base reference plane 330 and the horizontal plane 340 may be parallel, but when not parallel the base reference plane 330 and the horizontal plane 340 intersect along a line that is parallel to the X-axis. In some embodiments, the robot 100 can bend at the waist joint 150 through a range of waist angles from about 180° to at least less than about 90° to be able to pick items off the ground and to be able to inspect beneath low objects. In further embodiments, the robot 100 can bend at the waist joint 150 through a range of waist angles from about 180° to about 45°, 30°, 15°, or 0°. When the waist angle is about 180°, as in FIGS. 1 and 2, the longitudinal axes 320, 310 of the torso and leg segments 140, 130 are approximately collinear.

The base reference plane 330 has a fixed relationship relative to the base 110, however, that relationship can be defined in a variety of different ways. In FIG. 3, for example, the base reference plane 330 is defined through the centers of the wheels 120 and parallel to the top and bottom surfaces of the base 110. In other embodiments, however, the base reference plane 330 is defined by either the top surface or the bottom surface of the base 110, and in still other embodiments the base reference plane 330 is defined through the leading top edge and trailing bottom edge of the base 110 (i.e., across the diagonal of the base 110 in FIG. 3). The base reference plane 330 can also be defined as being perpendicular to the longitudinal axis 310 of the leg segment 130. It is also noted that the horizontal plane 340 serves as a convenient reference, however, the base angle can also be defined between any other plane in the external frame of reference, such as a vertical plane. Thus, stated more generally, the base angle is defined between a first reference plane having a fixed relationship to the base 110 and a second reference plane having a fixed relationship to the external frame of reference.

As noted above, the base 110 is supported on wheels 120 and includes one or more motors (collectively referred to herein as "the motor") configured to drive the wheels 120. The motor can be an electric motor, for example, which in some embodiments is powered by an internal power source such as a battery system in the base 110, while in other embodiments the motor is powered by an external power source coupled to the base 110 through a tether (not shown; see FIG. 8). In some embodiments, the internal power source is disposed above the waist joint 150, for example, in the torso segment 140. Other sources of electric power, such as a fuel cell, can also be employed, and it will be understood that the motor is not particularly limited to being electrically powered, but can also comprise an internal combustion engine, for example. Embodiments of the robot 100 can also include two motors so that each wheel 120 can be driven independently.

The wheels 120, in various embodiments, are adapted to the particular surfaces on which the robot 100 is intended to operate and therefore can be solid, inflatable, wide, narrow, knobbed, treaded, and so forth. In further embodiments, the wheels can be replaced with non-circular tracks such as tank treads.

The actuator 160, in some embodiments, comprises an hydraulic or pneumatic cylinder 180 connected between the torso segment 140 and either the leg segment 130 as shown, or the base 110. In those embodiments illustrated by FIGS. 1-3, the cylinder 180 is connected to a ball joint extending frontward from the torso segment 140 and is also pivotally attached to the leg segment 130. Other actuators, including electric motors, can also be employed in various embodiments. In some of these embodiments, the electric motor is coupled to a drive train comprising gears, belts, chains, or combinations thereof in order to bend the robot 100 at the waist joint 150.

Generally, the center of gravity of robot 100 should be as high as possible to make dynamic balancing more stable and easier to control. In those embodiments in which the robot 100 is configured to sit down and stand up again (see FIG. 10), the center of gravity of the torso segment 140 should also be as close to the head 170 as possible, and the center of gravity of the leg segment 130 should additionally be as close to the wheels 120 as possible so that the change in the base angle is maximized as a function of the change in the waist angle. In some of these embodiments, the center of gravity of the combined body segments above the waist (e.g., the torso segment 140 and the head 170) is further than half their overall length from the waist joint 150. In those embodiments in which the robot 100 is configured with arms to be able to pick up items off of the ground, the center of gravity of both segments 130, 140 should be as close to the waist joint 150 as possible so there is a minimum change in the base angle as a function of the change in the waist angle.

Figure 4:
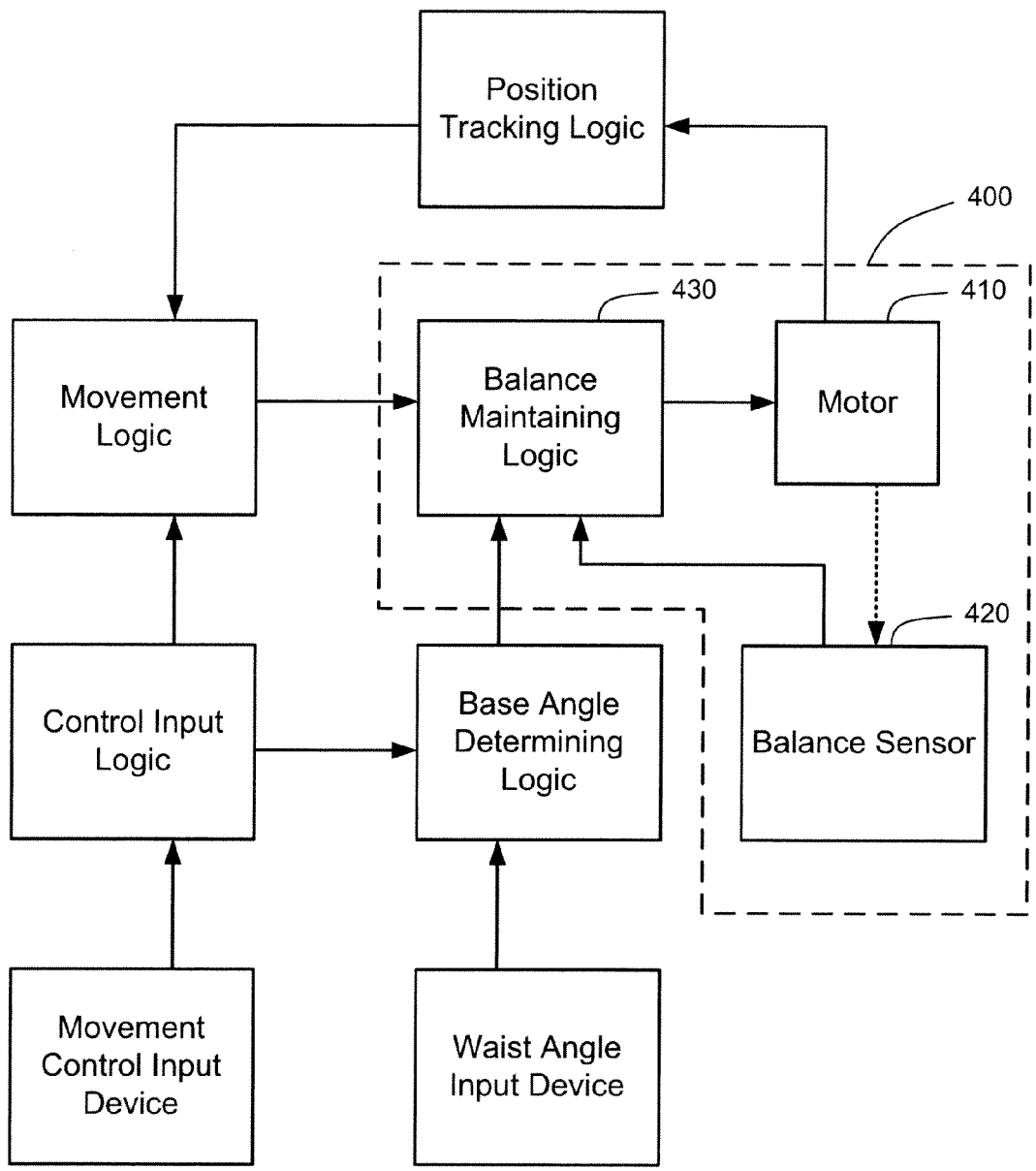
FIG. 4 is a schematic representation of a first control system configured to maintain the balance of the robot of FIGS. 1-3 on the wheels, according to an embodiment of the present invention.
Figure 5:
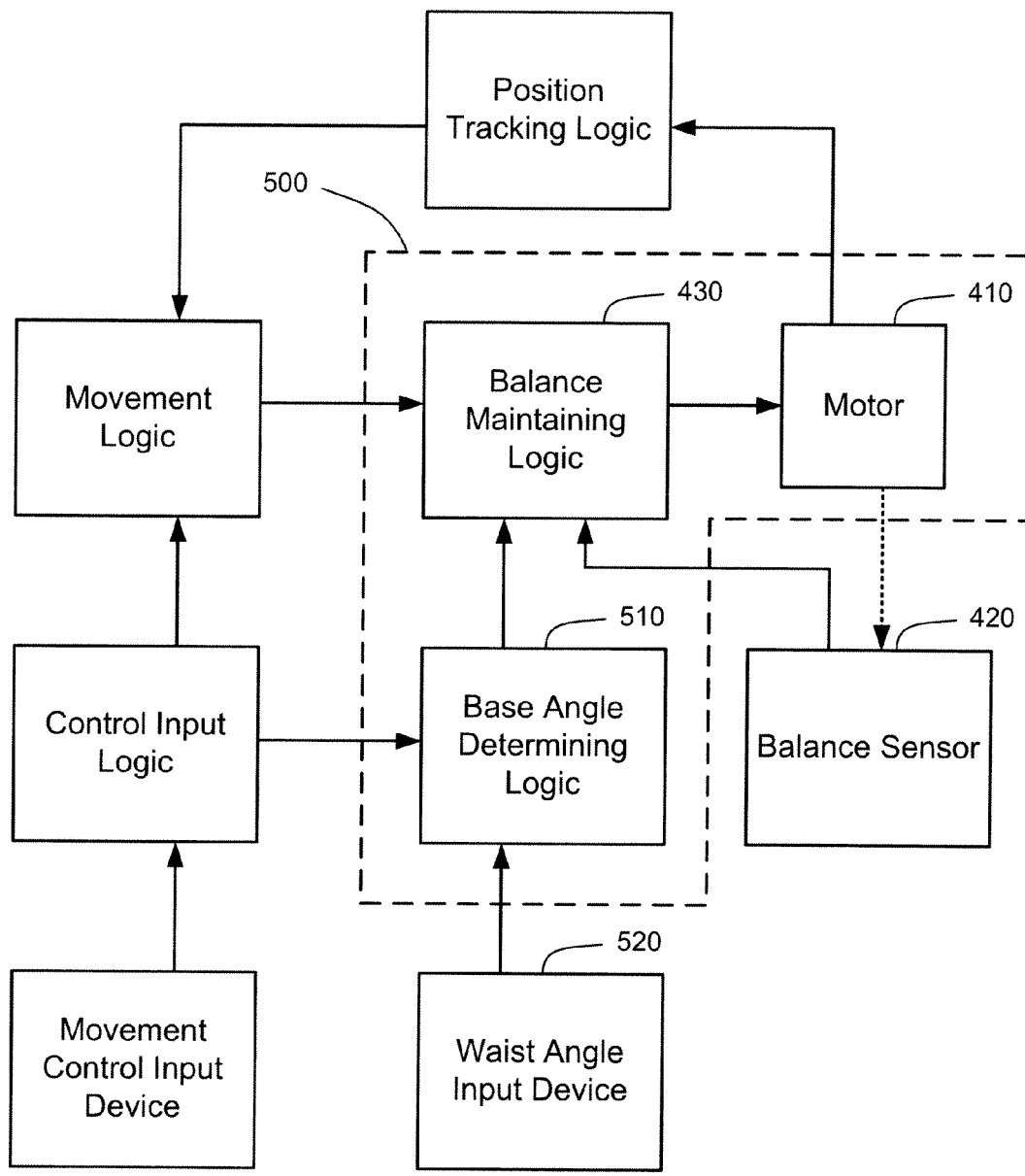
FIG. 5 is a schematic representation of a second control system configured to coordinate a change in the base angle of the robot of FIGS. 1-3 to accommodate a change in the waist angle of the robot of FIGS. 1-3, according to an embodiment of the present invention.

The robot 100 also comprises several control systems (not shown). A first control system, discussed below with reference to FIG. 4, is configured to maintain the balance of the robot 100 on the wheels 120. FIG. 5 describes a second related control system configured to coordinate a change in the base angle to accommodate a change in the waist angle. A third related control system allows the robot 100 to change location and/or orientation within the external frame of reference, as discussed with respect to FIG. 6.

FIG. 4 is a schematic representation of a first control system 400 configured to maintain the balance of the robot 100 of FIGS. 1-3 on the wheels 120, according to an exemplary embodiment. Other control components shown in FIG. 4 that are outside of the control system 400 are discussed with respect to FIGS. 5 and 6, below. The first control system 400 comprises the motor 410 in the base 110 for driving the wheels 120, a balance sensor 420, and balance maintaining logic 430. In operation, the balance maintaining logic 430 receives a balance signal from the balance sensor 420 and controls the motor 410, for instance with a control signal, to apply torque to the wheels 120, as necessary to maintain balance on the wheels 120.

The balance sensor 420 can be disposed in the base 110, the leg segment 130, the torso segment 140, or the head 170, in various embodiments. The balance sensor 420 can comprise, for example, a measurement system configured to measure acceleration along the three mutually perpendicular axes of the internal frame of reference noted in FIGS. 1 and 2. Accordingly, the balance sensor 420 can comprise a set of accelerometers and/or gyroscopes, for example. The balance maintaining logic 430 uses the acceleration measurements along the Z and Y-axes, in particular, to determine how much the robot 100 is tilting forward or backward. It will be appreciated that this tilting constitutes changing the base angle from a target base angle. This target base angle is the base angle at which the system is estimated to be balanced. Based on this determination, the balance maintaining logic 430 determines whether to rotate the wheels 120 clockwise or counterclockwise, and how much torque to apply, in order to counteract the tilting sufficiently to restore the base angle to the target base angle. The change in the orientation of the robot 100 as the balance maintaining logic 430 controls the motor 410 to drive the wheels 120 is then detected by the balance sensor 420 to close a feedback loop.

FIG. 5 is a schematic representation of a second control system 500 configured to coordinate a change in the target base angle of the robot 100 of FIGS. 1-3 to accommodate a change in the waist angle of the robot 100 of FIGS. 1-3, according to an embodiment of the present invention. It will be appreciated that, absent the compensation provided by the second control system 500, a change in the waist angle will change the center of gravity of the robot 100 and tilt the base. The first control system 400 will respond to this tilt by adjusting the position of the robot 100 by either rolling the robot 100 forward or backward causing the robot 100 to move from its location.

For example, if the waist angle is 180° (as illustrated in FIG. 1) and the base reference plane 330 is defined as shown, then the target base angle is 0° (e.g., parallel to the X-Y plane). If the waist angle is then changed to 150°, moving the center of gravity forward of the wheels 120, and the change to the waist angle is made without changing the target base angle, then the robot 100 will continuously roll forward in an attempt to keep from falling over. Without compensating for the change in waist angle, there is no static balanced state.

The second control system 500 is configured to determine the target base angle as a function of either a measured waist angle as the waist angle is changing or as a function of a target waist angle for a new posture. For example, if the measured or target waist angle is 150°, then the second control system 500 may determine, for example, that the base angle should be 25°. The base angle may be determined by the second control system 500 by reference to a look-up table, by calculation according to a formula, or the like. It will be appreciated, therefore, that the second control system 500 serves to keep the robot 100 at approximately a fixed location within the external frame of reference while bending at the waist joint 150, by coordinating the change in the base angle with the change in the waist angle so that the center of gravity is maintained approximately over the axis defined between the wheels 120. In contrast with some systems of the prior art, the base angle may vary while the robot 100 is approximately still. Further, the base angle is a value that is determined by the second control system 500 based on the waste angle, rather than being used as a control mechanism by a user, as in the prior art.

The second control system 500 comprises a base angle determining logic 510 which receives a signal generated by a waist angle input device 520, determines a target base angle, and sends the target base angle to the balance maintaining logic 430 which, in turn, activates the motor 410. In some embodiments, the waist angle input device 520 comprises a waist angle sensor disposed on the robot 100 at the waist joint 150. In these embodiments, the base angle determining logic 510 responds to changes in the waist angle, continuously updating the base angle in response to the waist angle. The waist angle sensor can be, for example, an optical encoder mounted on the axis of the waist joint 150, or a linear potentiometer integrated with the actuator 160. Some embodiments include more than one waist angle sensor configured to operate redundantly.

Figure 7:
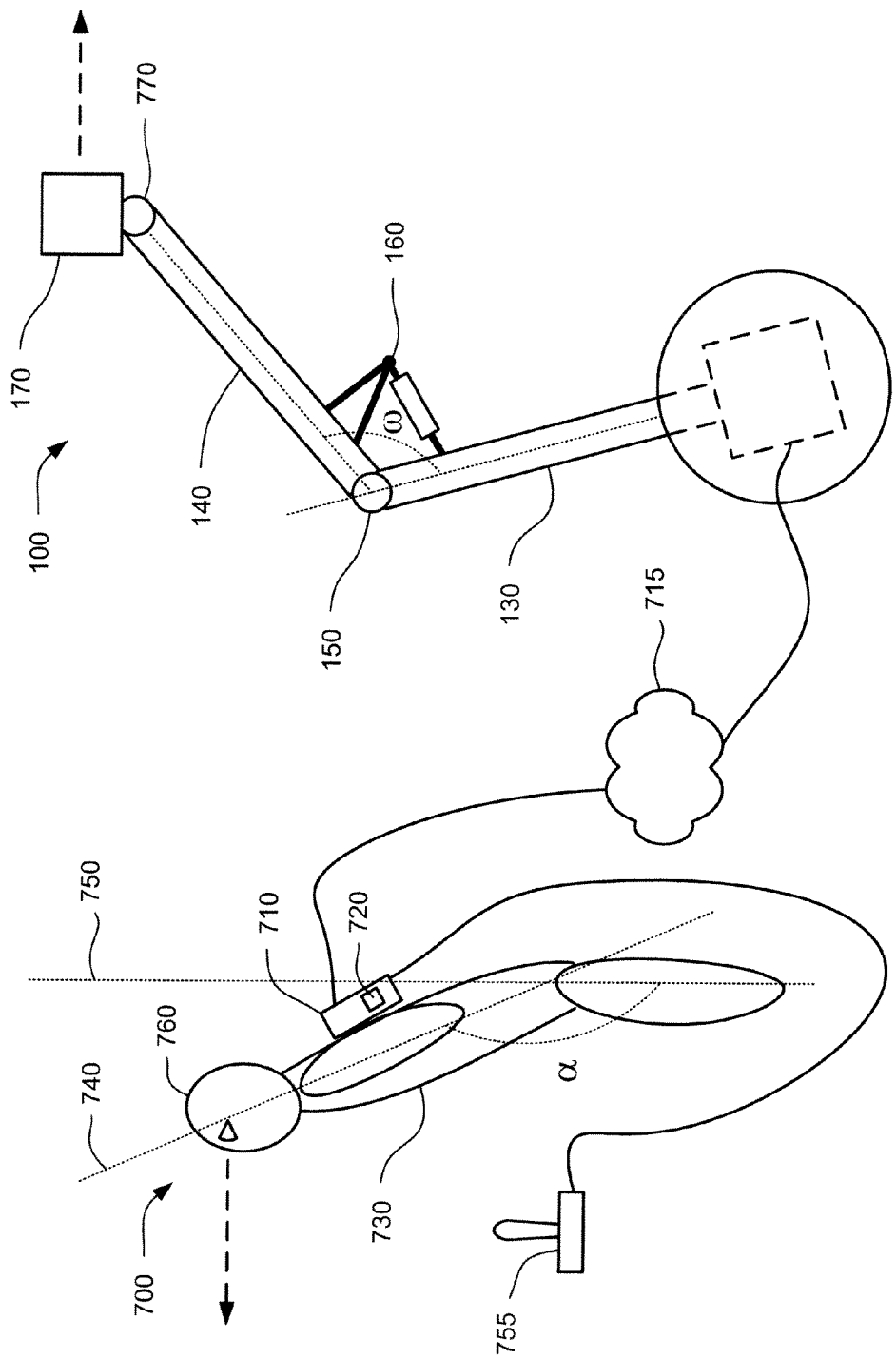
FIG. 7 shows a schematic representation of a person employing a human interface to remotely control the robot of FIGS. 1-3, according to an embodiment of the present invention.

In some embodiments, the waist angle input device 520 comprises an external input device configured to provide a target waist angle to base angle determining logic. For example, waist angle input device 520 may include a joystick, mouse, position sensor, processor, or some other device configured for a user to remotely actuate the actuator 160. Using the waist angle input device 520, an external operator can send a signal to the robot 100 to set the waist angle to a particular angle, or to bend at the waist joint 150 by a certain number of degrees. In these embodiments, the base angle determining logic 510 determines the target base angle for the target waist angle and then provides the target base angle to the balance maintaining logic 430. In some of these embodiments, the balance maintaining logic 430 also receives the signal from the waist angle input device 520 and synchronizes the control of the motor 410 together with the control of the actuator 160. It is noted here that the waist angle input device 520 may comprise logic within the robot 100 itself, in those embodiments where the robot 100 is configured to act autonomously or semi-autonomously. FIG. 7, below, further describes how the waist angle input device 520 can be part of a human interface for controlling the robot 100.

In some embodiments, the base angle determining logic 510 determines the target base angle for a given waist angle by accessing a set of previously determined empirical correlations between the base and waist angles. These empirically determined correlations can be stored in a look-up table or can be represented by a formula, for example. In some embodiments, determining the target base angle for a target waist angle optionally comprises searching the look-up table for the base angle that corresponds to the target waist angle, or interpolating a base angle where the target waist angle falls between two waist angles in the look-up table. In other embodiments, the base angle determining logic 510 comprises base angle calculator configured to calculate the base angle by applying a formula, performing a finite element analysis, or the like.

Figure 6:
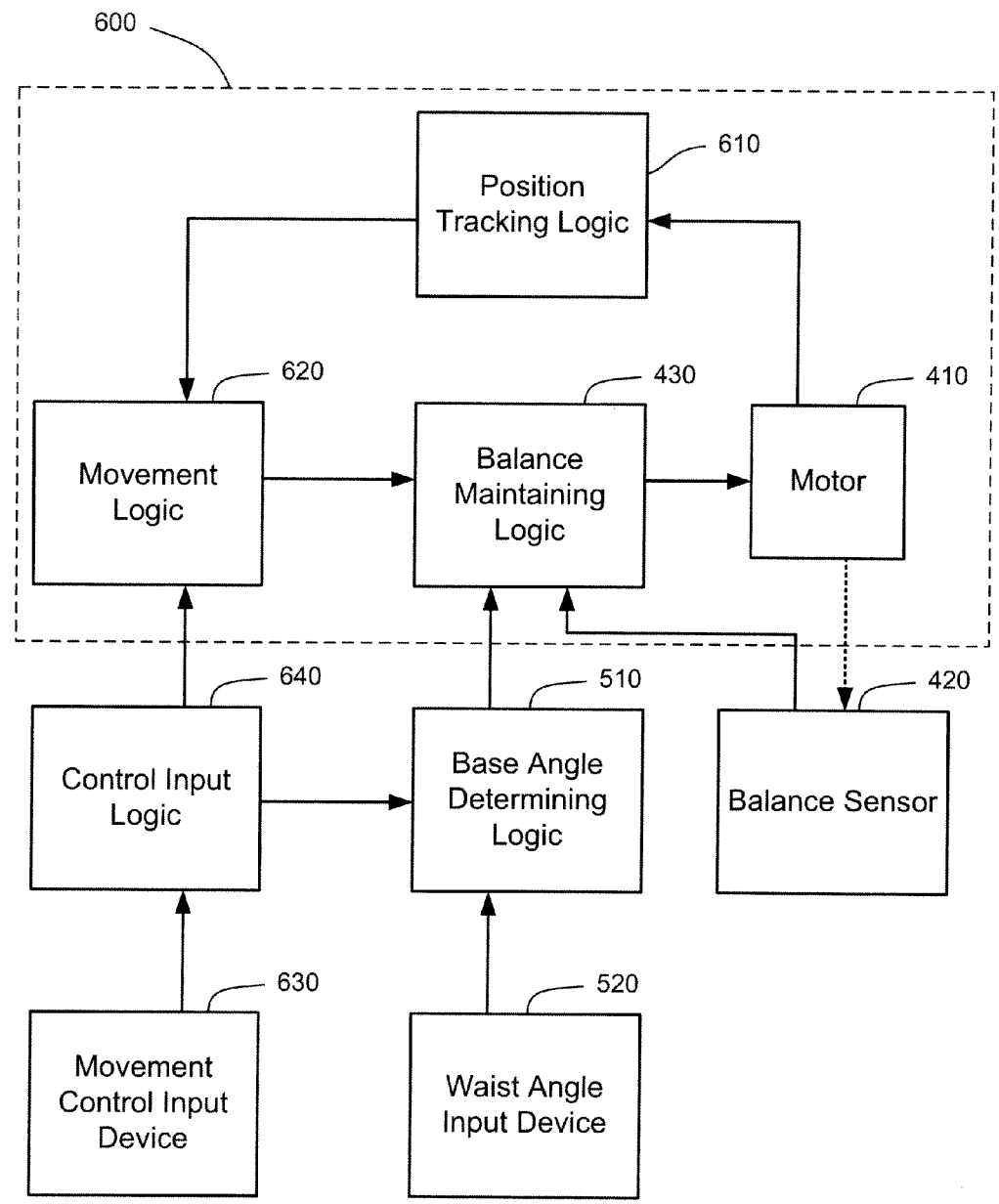
FIG. 6 is a schematic representation of a third control system configured to control the movement of the robot of FIGS. 1-3, according to an embodiment of the present invention.

While such empirically derived data that correlates base angles with waist angles may not take into account factors such as the positions of arms, or weight carried by the robot 100, in most instances such empirical data is sufficient to keep the robot 100 approximately stationary while bending at the waist joint 150. Where the robot 100 does shift location slightly due to such inaccuracy, a third control system, discussed below with respect to FIG. 6, is configured to control the movement of the robot 100 in order to return the robot 100 back to the original location. In alternative embodiments, positions of arms, weight carried, or other factors influencing center of gravity may be taken into account by base angle determining logic 510 when determining the target base angle.

In other embodiments, the base angle determining logic 510 determines the target base angle for a given waist angle by performing a calculation. For example, the overall center of gravity of the robot 100 can be computed so long as the masses and the centers of gravity of the individual components are known (i.e, for the base 110, segments 130 and 140, and head 170) and the spatial relationships of those components are known (i.e., the base and waist angles). Ordinarily, the center of gravity of the robot 100 will be aligned with the vertical axis. Therefore, in response to a change in the waist angle, or in response to an input to change the waist angle, the base angle determining logic 510 can solve for the base angle that will keep the center of gravity of the robot 100 aligned with the vertical axis.

FIG. 6 is a schematic representation of a third control system 600 configured to control the movement of the robot 100 of FIGS. 1-3, according to an embodiment of the present invention. Movement of the robot 100 can comprise rotating the robot 100 around the vertical axis, moving or returning the robot 100 to a particular location, moving the robot 100 in a direction at a particular speed, and executing turns while moving. The third control system 600 comprises position tracking logic 610 configured to track the location and orientation of the robot 100 relative to either the internal or external frame of reference. In some embodiments, the position tracking logic 610 tracks other information by monitoring the rotation of the wheels 120 and/or by monitoring other sources like the balance sensor 420. Examples of other information that can be tracked include the velocity and acceleration of the robot 100, the rate of rotation of the robot 100 around the vertical axis, and so forth.

The position tracking logic 610 can track the location and the orientation of the robot 100, for example, by monitoring the rotations of the wheels 120 and by knowing the circumferences thereof. Location and orientation can also be tracked through the use of range finding equipment such as sonar, radar, and laser-based systems, for instance. Such equipment can be either be part of the robot 100 or external thereto. In the latter case, location and orientation information can be received by the position tracking logic 610 through a wireless communication link. Devices or logic for monitoring wheel rotation, as well as the range finding equipment noted above, comprise examples of position sensors.

The third control system 600 also comprises movement logic 620 configured to receive at least the location information from the position tracking logic 610. The movement logic 620 can compare the received location information against a target location which can be any point within the relevant frame of reference. If the location information received from the position tracking logic 610 is different than the target location, the movement logic 620 directs the balance maintaining logic 430 to move the robot 100 to the target location. Where the target location is fixed while the second control system 500 coordinates a bend at the waist joint 150 with a change in the base angle, the third control system 600 will return the robot 100 to the target location to correct for any inaccuracies in the target base angle.

For the purposes of moving the robot 100 to a new location, the balance maintaining logic 430 has the additional capability to change the base angle so that the robot 100 deviates from balance momentarily to initiate a lean in the intended direction of travel. Then, having established the lean in the direction of travel, the balance maintaining logic 430 controls the motor 410 to apply torque to rotate the wheels 120 in the direction necessary to move in the desired direction. For example, with reference to FIG. 3, to move the robot 100 to the right in the drawing, the balance maintaining logic 430 initially directs the motor 410 to turn the wheels 120 counterclockwise to cause the robot 100 to pitch clockwise. With the center of gravity of the robot 100 to the right of the vertical axis, the balance maintaining logic 430 next turns the wheels 120 clockwise so that the robot 100 rolls to the right.

In some embodiments, the movement logic 620 can also compare orientation information received from the position tracking logic 610 against a target orientation. If there is a difference between the two, the movement logic 620 can instruct the balance maintaining logic 430 to rotate the robot 100 to the target orientation. Here, the balance maintaining logic 430 can control the wheels 120 to counter-rotate by equal amounts to rotate the robot 100 around the vertical axis by the amount necessary to bring the robot 100 to the target orientation. Other information tracked by the position tracking logic 610 can be similarly used by the movement logic 620 and/or components of other control systems.

Target locations and orientations can be determined by the movement logic 620 in a variety of ways. In some embodiments, the movement logic 620 can be programmed to execute moves at particular times or in response to particular signals. In other embodiments, the robot 100 is configured to act autonomously, and in these embodiments the robot 100 comprises autonomous logic configured to update the movement logic 620 as needed with new location and orientation targets. The movement logic 620 can also be configured, in some embodiments, to receive location and orientation targets from a human interface, such as described below with respect to FIG. 7.

In some embodiments, the robot 100 also comprises a control input logic 640 configured to receive movement control signals from a movement control input device 630. Control input logic 640 may be further configured to calculate a target location or velocity based on these signals, and to communicate the target location or velocity to the movement logic 620. Movement control input device 630 may comprise a joystick, mouse, position sensor, processor, or some other device configured for a user to indicate a target location or movement.

FIG. 7 shows a schematic representation of a person 700 employing a human interface to remotely control the robot 100 of FIGS. 1-3, according to an embodiment of the present invention. The human interface comprises a controller 710 that can be disposed, in some embodiments, within a backpack or a harness or some other means configured to be positioned on the body of the person 700. The controller 710 can also be carried by the person or situated remotely from the person 700. The controller 710 is optionally an example of waist angle input device 520 and or movement control input device 630.

With reference to FIG. 6, the controller 710 provides control signals to the base angle determining logic 510 and/or the control input logic 640. These control signals may be configured to provide a new target position and/or a new target waist angle. The controller 710 can be connected to the robot 100 through a network 715, in some embodiments. The network 715 can be an Ethernet, a local area network, a wide area network, the Internet, or the like. The connections to the network 715 from both or either of the controller 710 and robot 100 can be wired or wireless connections. In further embodiments the controller 710 and the robot 100 are in direct communication, either wired or wirelessly, without the network 715. In some embodiments, the robot 100 transmits signals and/or data back along the communication path to the controller 710 or other logic configured to operate the human interface to provide, for example, video, audio, and/or tactile feedback to the person 700.

The controller 710 comprises one or more sensors and/or detectors such as a position sensor 720 configured to detect an angle, $\alpha$, of a torso 730 of the person 700. Here, the angle of the torso 730 is an angle made between a longitudinal axis 740 of the torso 730 and a vertical axis 750. More specifically, when the person 700 is standing erect, the angle of the torso 730 is about zero and increases as the person 700 bends at the waist, as illustrated. The position sensor 720 can make this measurement, for example, through the use of accelerometers and/or gyroscopes positioned on the back of the person 700.

It will be understood, of course, that the human torso does not have a precisely defined longitudinal axis, so the longitudinal axis 740 here is defined by the orientation of the position sensor 720 with respect to the external frame of reference. More generally, just as the base angle is defined by two reference planes, one fixed to the base 110 and one fixed to the external frame of reference, the longitudinal axis 740 is fixed to the torso 730 and the vertical axis 750 is fixed to the external frame of reference. And just as in the case of the base angle, these axes 740, 750 can be arbitrarily fixed. The longitudinal axis 740 and the vertical axis 750 are merely used herein as they are convenient for the purposes of illustration.

As noted, the controller 710 can also comprise other sensors and/or detectors to measure other aspects of the person 700, such as the orientation of the person's head 760, where the person is looking, location and motion of the person's arms, the person's location and orientation within a frame of reference, and so forth. For simplicity, other sensors and detectors have been omitted from FIG. 7, but it will be appreciated that the controller 710 can support many such other sensors and detectors in a manner analogous to that described herein with respect to the position sensor 720. In some embodiments, the controller 710 and the position sensor 720, and/or other sensors and detectors, are integrated into a single device. In other embodiments, such as those embodiments in which the controller 710 is situated off of the body of the person 700, the controller 710 may communicate with the position sensor 720, for instance, over a wireless network.

The controller 710 optionally provides movement control signals from which the control input logic 640 can calculate a target location, for example. The movement control signals can be derived from measurements acquired from sensors and detectors configured to measure various aspects of the person

700. Other movement control signals provided by the controller 710 may also be derived from a movement control input device 630 such as a joystick 755. In still other embodiments, any of the sensors, detectors, and control input devices 630 can bypass the controller 710 and communicate directly to the control input logic 640 or the base angle determining logic 510.

As an example, the controller 710 can determine the angle of the torso 730 from the position sensor 720 and provide a control input signal derived from the angle of the torso 730 to the control input logic 640. In some embodiments, the control input signal comprises a target waist angle for the robot 100, determined by the controller 710, while in other embodiments the control input signal simply comprises the angle of the torso 730, and in these embodiments the control input logic 640 determines the target waist angle. Next, the control input logic 640 provides the target waist angle to the base angle determining logic 510 to determine the target base angle, and provides the target waist angle to the movement logic 620, or to the balance maintaining logic 430, to control the actuator 160.

As noted, either the controller 710 or the control input logic 640 can determine the target waist angle from the angle of the torso 730, in various embodiments. In some embodiments, this determination is performed by setting the target waist angle equal to the angle of the torso 730. In this way the waist angle of the robot 100 emulates the angle of the person's torso 730. Other embodiments are intended to accentuate or attenuate the movements of the person 700 when translated into movements of the robot 100, as discussed below.

As shown in FIG. 7, the angle of the torso 730 of the person 700 is less than the waist angle of the robot 100 to illustrate embodiments in which the person 700 bends at the waist and the degree of bending is accentuated so that the robot 700 bends further, or through a greater angle, than the person 700. Here, the target waist angle is determined by the controller 710, or the control input logic 640, to be greater than the angle of the torso 730. The target waist angle can be derived, for example, from a mathematical function of the angle of the torso 730, such as a scaling factor. In other embodiments, a look-up table includes particular waist angles of the robot 100 for successive increments of the angle of the torso 730. In these embodiments, deriving the target waist angle of the robot 100 from the angle of the torso 730 comprises finding in the look-up table the waist angle of the robot 100 for the particular angle of the torso 730, or interpolating a waist angle between two waist angles in the look-up table.

Just as the angle of the torso 730 can be used to control the waist angle of the robot 100, in some embodiments the head 760 of the person 700 can be used to control the head 170 of the robot 100. For example, the controller 710 can comprise one or more sensors (not shown) configured to monitor the orientation of the head 760 of the person 700, including tilting up or down, tilting to the left or right, and rotation around the neck (essentially, rotations around three perpendicular axes). In some embodiments, the direction in which the eyes of the person 700 are looking can also be monitored. The controller 710 can use such sensor data, in some embodiments, to derive a target orientation of the head 170 to transmit as a control input signal to the control input logic 640. In other embodiments, the controller 710 transmits the data from the sensors as the control input signal to the control input logic 640, and then the control input logic 640 derives the target orientation of the head 170.

In some embodiments, the controller 710 or control input logic 640 is configured to keep the orientation of the head 170 of the robot 100 equal to that of the head 760 of the person 700, each with respect to the local external frame of reference. In other words, if the person 700 tilts her head forward or back by an angle, the head 170 of the robot 100 tilts forward or back by the same angle around a neck joint 770. Likewise, tilting to the left or right and rotation around the neck (sometimes referred to as panning) can be the same for both the head 760 of the person 700 and the head 170 of the robot 100, in various embodiments. In some embodiments, the neck joint 770 is limited to panning and tilting forward and back, but not tilting to the left and right.

In further embodiments, keeping the orientation of the head 170 of the robot 100 equal to that of the head 760 of the person 700 can comprise tilting the head 170 of the robot 100 through a greater or lesser angle than the head 760 of the person. In FIG. 7, for example, where the person 700 bends at the waist through an angle and the robot 100 is configured to bend at the waist joint 150 through a greater angle, the head 760 of the robot 100 nevertheless can remain oriented such that stereo cameras (not shown) in the head 170 have a level line of sight to match that of the person 700. Here, the head 170 of the robot 100 tilts back through a greater angle than the head 760 of the person 700 to compensate for the greater bending at the waist joint 150.

Figure 8:
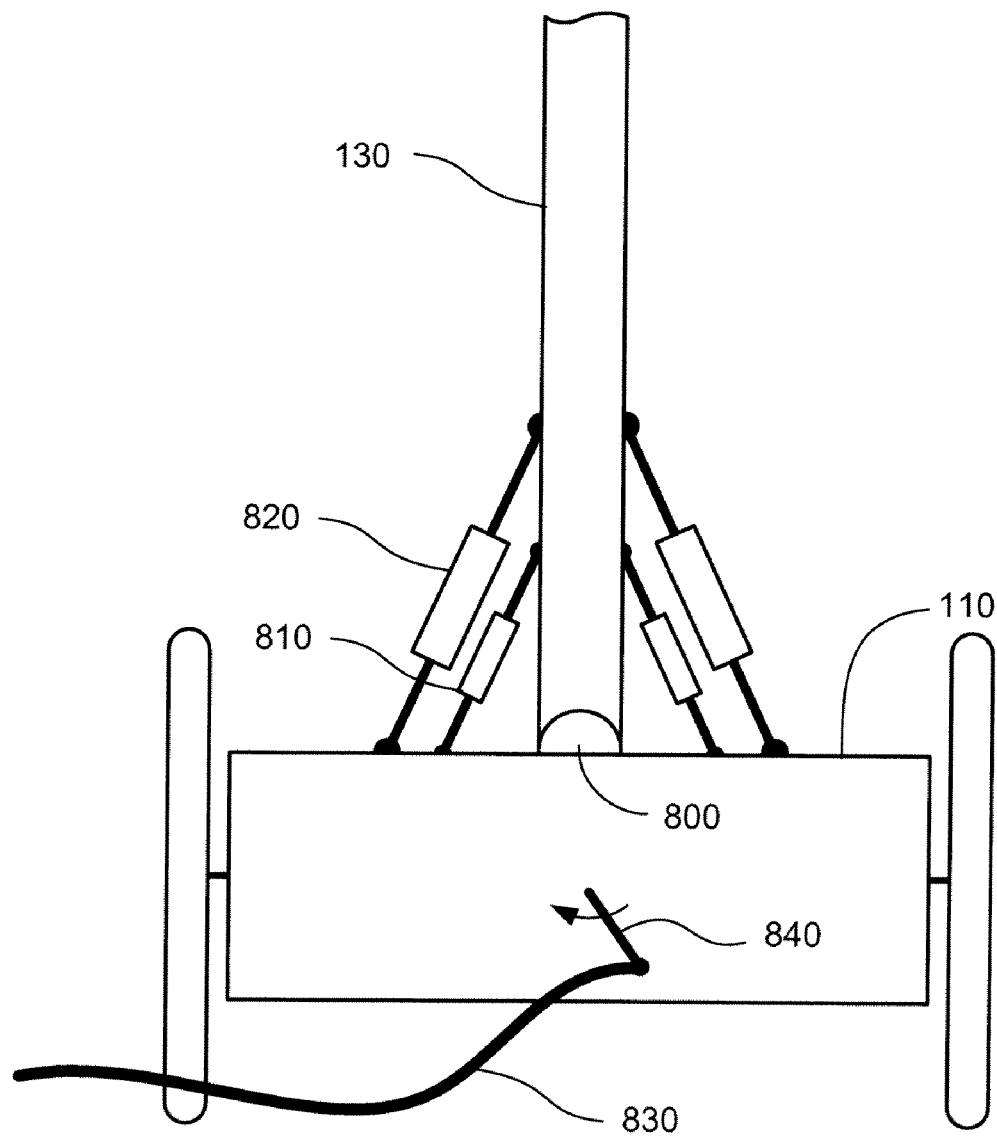
FIG. 8 shows the robot of FIGS. 1-3 further comprising a lean joint, according to an embodiment of the present invention.

FIG. 8 shows the robot 100 of FIGS. 1-3 further comprising a lean joint 800, according to an embodiment of the present invention. The lean joint 800 can be disposed along the leg segment 130 near the base 110, while in other embodiments the lean joint couples the leg segment 130 to the base 110 as illustrated by FIG. 8. The lean joint 800 permits rotation of the leg segment 130 around the horizontal axis relative to the base 110. In other words, the lean joint 800 permits tilting of the leg segment 130 in a direction that is perpendicular to the movement of the torso segment 140 enabled by the waist joint 150. This can permit the robot 100 to traverse uneven or non-level surfaces, react to forces that are parallel to the transverse axis, lean into turns, and so forth. Here, the control logic described with respect to FIGS. 4-6, or analogous control logic, can keep the leg segment generally aligned with the Y-Z plane while the base 110 tilts relative to this plane due to a sloped or uneven surface. In some embodiments, such control logic can control the leg segment 130 to lean into turns.

In various embodiments, the robot 100 includes one or more stabilizers 810, such as springs or gas-filled shock-absorbers for example, configured to restore the leg segment 130 to an orientation perpendicular to the base 110. In further embodiments, the robot 100 additionally comprises, or alternatively comprises, one or more actuators 820 configured to move the leg segment 130 around the lean joint 800 relative to the base 110. The balance maintaining logic 430, in some embodiments, receives information from the balance sensor 420 regarding tilting around the transverse axis and controls the actuator 820 to counteract the tilt. In some embodiments, the one or more actuators 820 comprise hydraulic or pneumatic cylinders. It will be understood that one or more stabilizers can also be analogously employed at the waist joint 150 in conjunction with the actuator 160.

FIG. 8 also illustrates an optional tether 830 extending from the base 110. The tether can be used to provide communications, power, and/or compressed air for pneumatics to the robot 100. Those embodiments that include the tether 830 may optionally also include an actuated tail 840 extending outward from the base and coupling the tether 830 to the base 110. The tail 840, when actuated, rotates around a pivot point in order to move the tether 830 out of the way of the wheels 120 when the robot 100 is driven backwards.

Figure 9:
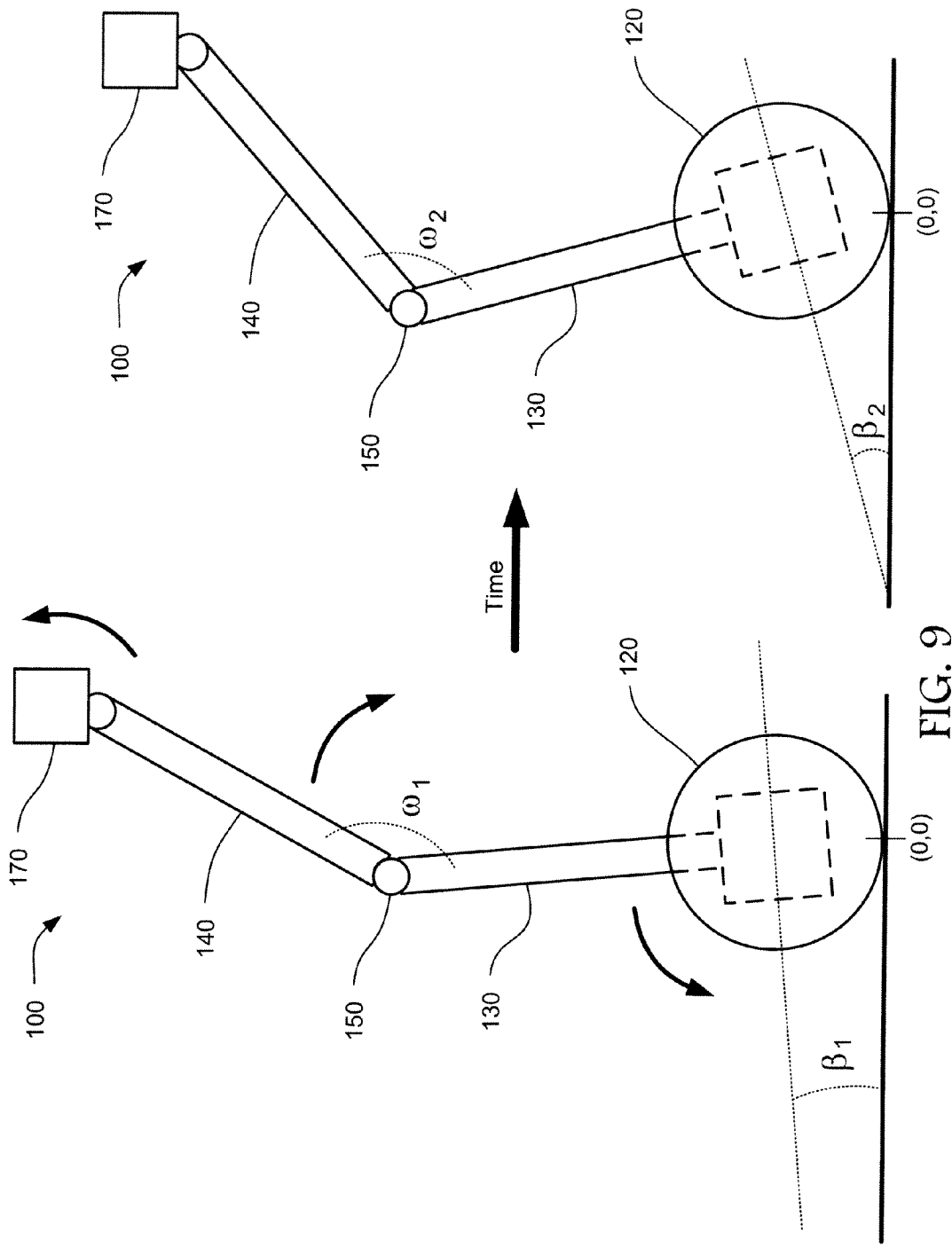
FIG. 9 graphically illustrates a method according to an embodiment of the present invention.

FIG. 9 graphically illustrates a method according to an embodiment of the present invention. According to the method, the robot 100 maintains balance on two wheels and maintains a location within the external frame of reference while bending at the waist joint 150. FIG. 9 shows the robot 100 configured according to a first posture at a time 1 and configured according to a second posture at a later time 2. At time 1 the robot 100 is configured with a first waist angle, $\omega_1$, and a first base angle, $\beta_1$, and at time 2 the robot 100 is configured with a second waist angle, $\omega_2$, and a second base angle, $\beta_2$. As indicated in FIG. 9, the robot 100 at time 1 is at a location in the external frame of reference given the coordinates (0, 0) remains at the location until time 2.

Balance of the robot 100 on two wheels can be maintained by a feedback loop. For example, when a change in a base angle of the robot 100 is measured, the wheels 120 are rotated to correct for the change so that the base angle is maintained and the wheels 120 stay approximately centered beneath the center of gravity of the robot 100.

Bending is accomplished over the interval from time 1 to time 2 by changing the base angle while changing the waist angle such that the wheels do not appreciably rotate. As indicated in FIG. 9, changing the base angle comprises rotating the base around an axis of the wheels 120, and changing the waist angle comprises rotating the torso segment around the waist joint 150 relative to the leg segment 130.

Here, changing the base angle while changing the waist angle such that the wheels do not appreciably rotate includes embodiments where the waist angle and the base angle change continuously over the same period of time and embodiments where changing the angles is performed in alternating increments between incremental changes in the waist angle and incremental changes in the base angle. In these embodiments, the robot 100 is capable of transitioning between postures without the wheels 120 appreciably rotating, in other words, without the robot 100 rolling forward and back. "Appreciably" here means that slight deviations back and forth can be tolerated to the extent that the robot 100 provides the necessary level of stability for an intended purpose, such as a robot 100 operated by telepresence.

In embodiments that employ a motor 410 configured to rotate the wheels 120, changing the base angle while changing the waist angle can be accomplished by balancing the torque applied by the motor 410 against the torque applied to the wheels 120 by the shift in the center of gravity due to the changing waist angle. The second control system 500 can be employed to change the base angle while changing the waist angle, but it will be understood that the control system 500 is merely one example of a computer-implemented control suitable for performing this function.

Methods illustrated generally by FIG. 9 can further comprise receiving a target waist angle. For example, the base angle determining logic 510 can receive the target waist angle from autonomous logic of the robot 100, or from a human interface such as controller 710. In some embodiments, changing the base angle includes determining a target base angle from the target waist angle such as with the base angle determining logic 510. In some of these embodiments, determining the target base angle from the target waist angle includes searching a database for the base angle that corresponds to the target waist angle. In other instances the target base angle is calculated based on the target waist angle.

Methods illustrated generally by FIG. 9 can further comprise either changing an orientation of the head 170 of the robot 100, or maintaining a fixed orientation of the head 170, while changing the waist angle. As noted above, changing the orientation of the head 170 can be accomplished in some embodiments by monitoring the orientation of the head 760 of the person 700, and in further embodiments, the direction in which the eyes of the person 700 are looking. Here, the orientation of the head 170 can follow the orientation of the head 760 of the person 700, for example.

The method can comprise deriving an orientation of the head 170 from the sensor data with the controller 710 and then transmitting the target orientation as a control input signal to the control input logic 640. Other embodiments comprise transmitting the sensor data as the control input signal to the control input logic 640, and then deriving the target orientation of the head 170 with the control input logic 640. Regardless of how the orientation of the head 170 is derived, the target orientation can be achieved through rotating the head 170 around a neck joint 770 relative to the torso segment 140. In some embodiments, as shown in FIG. 9, the rotation is around an axis, disposed through the neck joint 770, that is parallel to the transverse axis. Additional rotations around the other two perpendicular axes can also be performed in further embodiments.

Some embodiments further comprise maintaining a fixed orientation of the head 170 while changing the waist angle. Here, one way in that the target orientation can be maintained is by a feedback loop based on a visual field as observed by one or more video cameras disposed in the head 170. If the visual field drifts up or down, the head 170 can be rotated around an axis of the neck joint 770 in order to hold the visual field steady.

Figure 10:
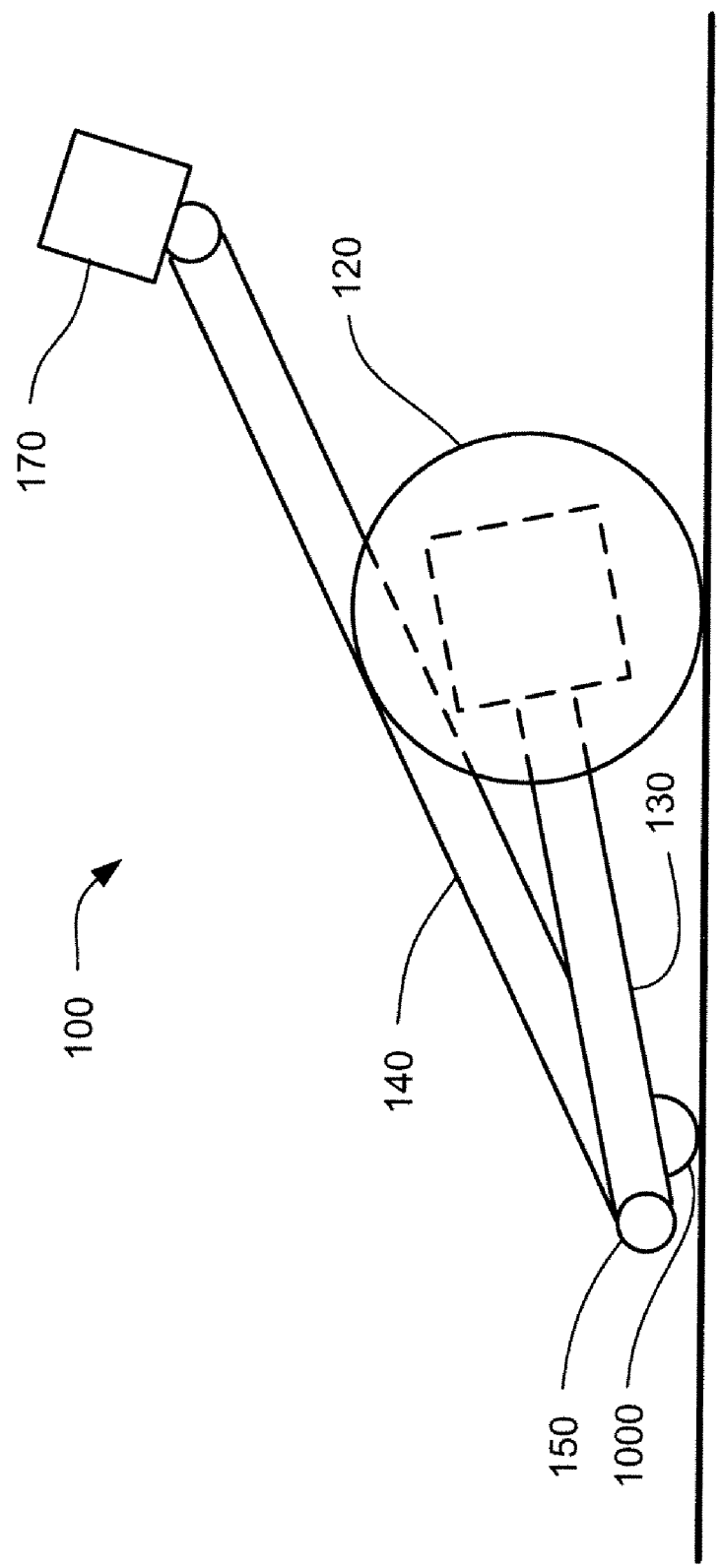
FIG. 10 shows the robot of FIGS. 1-3 in a sitting posture according to an embodiment of the present invention.

FIG. 10 shows the robot 100 in a sitting posture according to an embodiment of the present invention. The sitting posture can be used, for example, as a resting state when the robot 100 is not in use. The sitting posture is also more compact for transportation and storage. In some embodiments, the leg segment 130 includes a bumper 1000 for making contact with the ground when the robot 100 is sitting. It can be seen that the sitting posture of FIG. 10 can be achieved by continuing the progression illustrated by FIG. 9. In some instances, the robot 100 will not be able to bend at the waist joint 150 all of the way to the sitting posture, but can come close, for example, by bringing the bumper 1000 to about 6 inches off of the ground. From this position, the robot 100 can safely drop the remaining distance to the ground. To bring the robot 100 to a standing posture from the sitting posture shown in FIG. 10, a sudden torque is applied by the motor to the wheels 120 and as the center of gravity moves over the center of the wheels 120 the actuator 160 begins to increase the waist angle and the robot 100 begin to balance, as described above.

As provided above, in these embodiments the center of gravity of the torso segment 140 should also be as close to the head 170 as possible, and the center of gravity of the leg segment 130 should additionally be as close to the wheels 120 as possible. Towards this goal, the length of the torso segment 140 can be longer than the length of the leg segment 130. The length of the torso segment 140 is shown to be longer in FIG. 10 than in preceding drawings to illustrate this point. In some instances, the center of gravity of the combined body segments above the waist joint 150, such as the torso segment 140 and head 170, is further than half their overall length from the waist joint 150.

Figure 11:
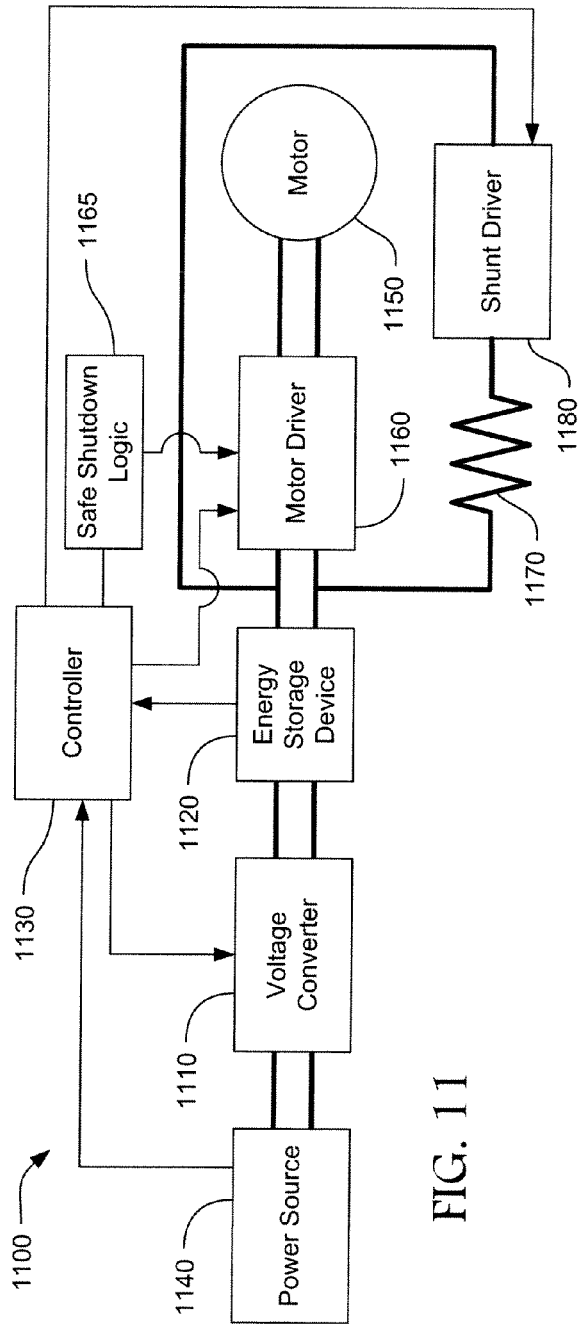
FIG. 11 is a schematic representation of a system for supplying power to a robotic system according to an embodiment of the present invention.

FIG. 11 is a schematic representation of a system 1100 for supplying power to electrically activated components of a robotic system according to an embodiment of the present invention. During normal operation, the system 1100 is capable of supplying the power needs of the components from a power source, such as the AC power grid or a DC battery system. The system 1100 is also capable, during a deleterious power event, of supplying sufficient power for a short duration from an energy storage device that is separate from the power source. The energy storage device maintains a sufficient energy reserve such that the robotic system can at least achieve a stable shutdown configuration. Examples of deleterious power events include the sudden loss of power, such as when a power cord is severed or a fuse blows, a loss of sufficient power, such as when a battery system runs low, transient power spikes, and the like. Another application for the system 1100 is to supply power to electrically activated components of the robotic system to meet a short-term power demand that is beyond that which the power source alone can satisfy. This is considered herein to be a deleterious power event, although the power source is not diminished, since the short-term power demand exceeds the capacity of the power source.

In some of these embodiments, the robotic system is configured to dynamically balance on no more than two points. Examples of dynamically balancing robotic systems that can employ the system 1100 include the robot 100 described above as well as other inverted pendulum robots, including dynamically balancing robotic personal vehicles. Other dynamically balancing robotic systems that can employ the system 1100 include robotic systems that employ bipedal locomotion and are therefore configured to dynamically balance on two legs. It will be understood that the system 1100 can also be employed in robotic systems that do not dynamically balance but that nevertheless can become unstable or uncontrollable during a power disruption, such as remotely piloted vehicles.

The system 1100 comprises a voltage converter 1110 in electrical communication with an energy storage device 1120, and also in communication with a controller 1130, such as a processor. Here, "electrical communication" refers to a connection by power lines and is represented by a pair of heavy lines. "Communication" otherwise refers to a suitable connection for communicating measurement and control signals. Lines of such communication are shown as single lines of normal weight. Such communication can be achieved over wired connections, wireless connections, and in some instances over the same power lines used to provide electrical communication.

The system 1100 further comprises, in some embodiments, a power source 1140 in electrical communication with the voltage converter 1110. In other embodiments, the system 1100 does not comprise the power source 1140, however, in these embodiments the voltage converter 1110 is configured to be connected to the power source 1140 such that the two are in electrical communication. In various embodiments the power source 1140 can be an AC power source or a DC power source.

In those embodiments where the system 1100 does comprise the power source 1140, the power source 1140 can comprise a battery system, such as a rechargeable battery system. The power source 1140 can also comprise a fuel cell, a generator driven by an internal combustion engine, or the like. Where the robotic system comprises an embodiment of the robot 100, the power source 1140 can be disposed within the torso segment 140, for instance.

In those embodiments where the system 1100 does not comprise the power source 1140, the power source 1140 can comprise the same sources just described as well as an AC power source such as an AC power grid. In these embodiments, the power source 1140 can be placed into electrical communication with the voltage converter 1110 by a power cable, such as tether 830 (FIG. 8). The voltage converter 1110 can be a DC to DC converter or an AC to DC converter, in various embodiments, depending on the type of power produced by the power source 1140. An exemplary voltage converter 1110 comprises an H-bridge DC/DC boost/buck converter.

In various embodiments the controller 1130 is in communication with the power source 1140 and in these embodiments the controller 1130 includes logic configured to receive information including operational parameters from the power source 1140. For example, one operational parameter that can be received by the controller 1130 is the voltage being produced by the power source 1140. For an electrochemical battery, the voltage can be an indicator of remaining battery capacity. Another operational parameter that can be received by the controller 1130 is the temperature of the power source 1140.

The logic of the controller 1130 can also monitor the power source 1140 for indications of a deleterious power event, whether the power source 1140 is a DC power source or an AC power source. An example of an indication of a deleterious power event is a drop in the voltage of the power source 1140 below some threshold. While voltage of the power source 1140 can be measured directly at the power source 1140, as indicated in FIG. 11, the voltage of the power source 1140 can also be measured indirectly at the input side of the voltage converter 1110. In some embodiments, the threshold for determining a deleterious power event is a function of other factors. For example, the threshold can be dependent on both the voltage and the temperature of the power source 1140.

The voltage converter 1110 can serve several functions. The voltage converter 1110 isolates the energy storage device 1120 from the voltage of the power source 1140, which may be either higher or lower than the charge voltage of the energy storage device 1120 at any given time. One benefit of this isolation is that the power source 1140 can supply power at a higher or lower voltage than that required for operating the components powered by the system 1100. This, in turn, allows for the use of a wide range of power sources 1140.

The controller 1130 includes logic configured to regulate the current drawn by the voltage converter 1110 to not exceed the maximum current which can be safely supplied by the power source 1140, also known as the safe discharge rate. The controller 1130, in some embodiments, can also shut down the voltage converter 1130 by setting the charge current to zero. In some embodiments, the voltage converter 1110, instead of the controller 1130, includes the logic configured to regulate the current drawn by the voltage converter 1110 to not exceed the safe discharge rate. The controller 1130 also can include, in some embodiments, logic configured to regulate the voltage applied by the voltage converter 1110 to not exceed a voltage rating of the energy storage device 1120. This logic can also be included in the voltage converter 1110, rather than the controller 1130.

The energy storage device 1120 can comprise, for example, a capacitor system including one or more capacitors arranged in parallel, in series, or in combinations of in parallel and in series. Examples of suitable capacitors include standard electrolytic capacitors as well as ultracapacitors. Ultracapacitors are also known as electric double-layer capacitors or electrochemical double layer capacitors (EDLCs). Ultracapacitors are particularly suitable for use in the energy storage device 1120 because ultracapacitors offer high numbers of charge-discharge cycles, rapid charging and discharging rates, high power densities and high output power. A capacitor system that includes one or more ultracapacitors is referred to herein as an ultracapacitor assembly. Exemplary ultracapacitor assemblies are provided in U.S. Pat. No. 7,085, 112 that issued on Aug. 1, 2006, which is incorporated herein by reference. In some embodiments, energy storage device 1120 is characterized by a power density of at least 000 W/kg and/or an energy density of 1 Wh/Kg.

In operation, logic of the controller 1130, or of the voltage converter 1110 itself, monitors the voltage of the energy storage device 1120, and also monitors the current flowing into the energy storage device 1120 from the power source 1140 and to or from the attached components such as the motor 1150. Under normal conditions, the voltage converter 1110 is regulated by such logic to keep the energy storage device 1120 fully charged with power received from the power source 1140. As an example, the controller 1130 can regulate the current supplied by the voltage converter 1110 in order to limit the charge rate of the energy storage device 1120 to 10A, which is a safe level for a 10 Ah lithium-ion battery. If the power source 1140 is in electrical communication with the voltage converter 1110 over a power line comprising either long or thin-gage wires, a large current spike can result in a voltage droop due to the high resistance of these wires. Limiting the current drawn by the voltage converter 1110 limits the magnitude of any such voltage droop.

Similarly, the controller 1130 includes logic configured to regulate the voltage applied to the energy storage device 1120 by the voltage converter 1110. The voltage applied to the energy storage device 1120 can be limited to within an acceptable range for charging the energy storage device 1120, such as the voltage rating of the energy storage device 1120. This prevents the energy storage device 1120 from being damaged by too high of an applied voltage. The voltage converter 1110 can also prevent a reverse flow from the energy storage device 1120 to the power source 1140 where the voltage of the energy storage device 1120 is greater than that of the power source 1140. In some embodiments, the voltage converter 1110, instead of the controller 1130, includes the logic configured to regulate the voltage applied to the energy storage device 1120.

It will also be appreciated that in some embodiments logic of the controller 1130 can monitor the energy storage device 1120 for indications of a deleterious power event, in addition to, or in the alternative to monitoring the power source 1140. Under normal operation, the controller 1130 can vary the power proved by the voltage converter 1110 to the energy storage device 1120 in order to keep the voltage at the energy storage device 1120 approximately constant while the load from the various attached components fluctuates. If the voltage begins to fall and the controller 1130 is unable to keep the voltage of the energy storage device 1120 approximately constant, the controller can, in some instances, modify one or more operational limits of the robot to decrease the rate at which energy is being used, as discussed below. If the controller 1130 cannot keep the voltage of the energy storage device 1120 from decreasing by modifying operational limits of the robot, this could indicate a deleterious power event, including a failure of the voltage converter 1110, and a safe shutdown can be initiated, as also discussed below.

An example of a robot component that can be powered with the system 1100 is a motor 1150. In some embodiments, the motor 1150 is driven by a motor driver 1160 in electrical communication with the energy storage device 1120. Exemplary motor drivers 1160 include an H-bridge and a 3-phase brushless controller/driver. It will be appreciated that more than one component can be powered in parallel by the system 1100. The motor 1150 can be a motor 410 (FIGS. 4-6) for driving wheels 120 or a motor of an actuator such as actuator 160 (FIG. 1), for example.

Generally, any component of a robot can be powered by the system 1100. In some embodiments, the system 1100 powers at least those components that are employed to achieve a stable shutdown configuration. In various embodiments, the system 1100 under normal conditions powers the entire robot from the power source 1140.

Additionally, where one or more components require more power than the power source 1140 can supply, the system 1100 can provide power from the power source 1140 and the energy storage device 1120 in parallel to meet such power demands, at least for a short duration. The controller 1130, in some embodiments, includes logic configured to modify one or more operational limits of the robot when the energy storage device 1120 has been depleted to at least a threshold, such as half the maximum charge voltage. For instance, the controller 1130 can lower the maximum speed of the robot to reduce the power demand when the energy storage device 1120 has been depleted to the predetermined threshold. This situation can be encountered, for example, when the robot is travelling a long distance up an incline. In FIG. 11, modifying an operational limit is illustrated by the direct line from the controller 1130 to the motor driver 1160 which can represent the controller 1130 controlling the maximum speed at which the motor driver 1160 can drive the motor 1150. It will be further appreciated that the logic of the controller 1130, in other embodiments, can be configured to modify an operational limit of the robot as a function of the charge voltage of the energy storage device 1120, rather than in response to a threshold as in the above example.

During a deleterious power event, safe shutdown logic 1165 of the system 1100 limits the power provided by the energy storage device 1120 to a select set of components of the system 1100 that are used to bring the robot to a stable shutdown configuration. The safe shutdown logic 1165 can be configured, in some embodiments, to control the select components through a series of safe shutdown steps that results in the stable shutdown configuration. The shutdown logic 1165 can be logic included in the controller 1130, in some embodiments, or can be separate from the controller 1130, as shown in FIG. 11.

In various embodiments, the energy storage device 1120 is able to supply the peak power requirement of the robot for between about 2 seconds and about 2 minutes when initially substantially charged. Peak power is defined as the power required to decelerate the robot at 0.5 g (4.9 m/s$^2$) to a complete stop and to achieve a stable shutdown configuration when initially traveling at nominal top speed, including all energy lost to inefficiencies.

As an example, when the system 1100 is employed in embodiments of the robot 100, the system 1100 can deliver power from the power source 1140 to the entire robot 100. The system 1100 can also deliver power from the power source 1140 and the energy storage device 1120 in parallel to the entire robot 100 when the power demand exceeds the capacity of the power source 1140 alone, until the energy storage device 1120 has been depleted to some predefined threshold. In the event that the controller 1130 recognizes a deleterious power event, the safe shutdown logic 1165 selectively provides power to the motor 410 (FIG. 4), the actuator 160 (FIG. 1), and necessary electronics such as those found in control systems 400, 500, and 600. The energy storage device 1120, when charged to at least the threshold, has the capacity to power the motor 410, the actuator 160, and the electronics long enough to achieve the sitting posture illustrated by FIG. 10 starting from any other posture and while traveling at nominal top speed.

In some embodiments, one or more of the components powered by the system 1100 is also capable of producing energy under certain circumstances, such as by regenerative breaking. This energy can be used to recharge the energy storage device 1120 and in some embodiments, can be used to recharge the power source 1140, as discussed below with respect to FIG. 13.

In those embodiments where one or more of the components is capable of producing energy, the system 1100 optionally also comprises means for dissipating excess energy received back from these components. Dissipating the excess energy serves to prevent overcharging of the energy storage device 1120. A simple example of means for dissipating excess energy comprises a shunt circuit including a resistor 1170 and a shunt driver 1180 which can be a switch, for example. Excess energy is dissipated by the resistor 1170 as heat. Here, the controller 1130 comprises logic configured for monitoring operating parameters of the energy storage device 1120 and the components of the system 1100, such as the motor driver 1160. If the motor driver 1160 is producing energy and the charge voltage of the energy storage device 1120 is close to the maximum, then logic of the controller 1130 controls the shunt driver 1180 such that the excess energy is directed through the shunt circuit.

Figure 12:
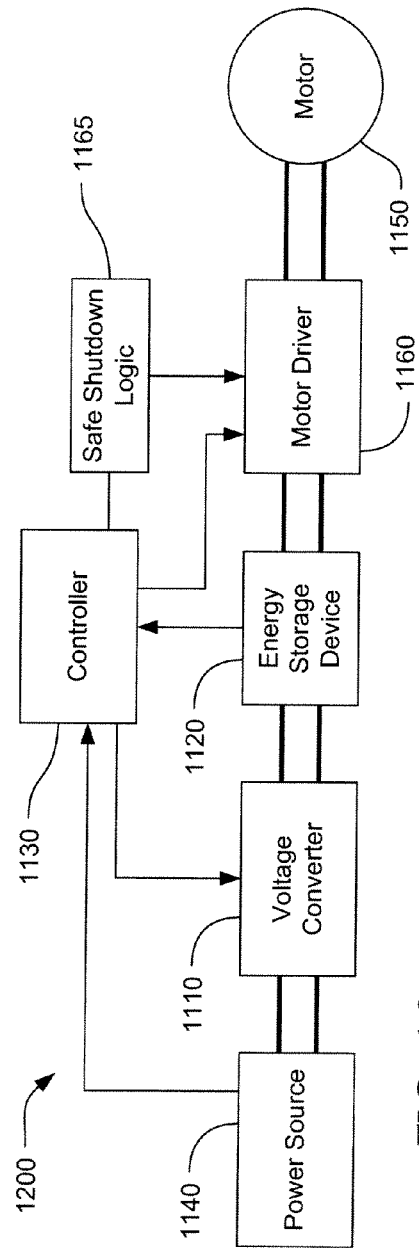
FIG. 12 is a schematic representation of a system for supplying power to a robotic system according to another embodiment of the present invention.

Another means for dissipating excess energy is illustrated by the system 1200 of FIG. 12. Again, the controller 1130 monitors the operational parameters of the energy storage device 1120 and the components attached to the system 1200. If the charge voltage of energy storage device 1120 is near the maximum and energy is coming back from one or more of the components, then logic of the controller 1130 adds an oscillation to the drive voltage applied to the motor 1150. Suitable frequencies for the oscillation range from about 3 Hz to about 1000 Hz, in some embodiments. Dissipating excess energy through a motor 1150, and especially through a motor that drives wheels 120, can be advantageous because of the large thermal mass available to absorb the heat that is produced. Additionally, the added oscillation can produce sound and/or vibration that can alert an operator to an undesirable condition.

Figure 13:
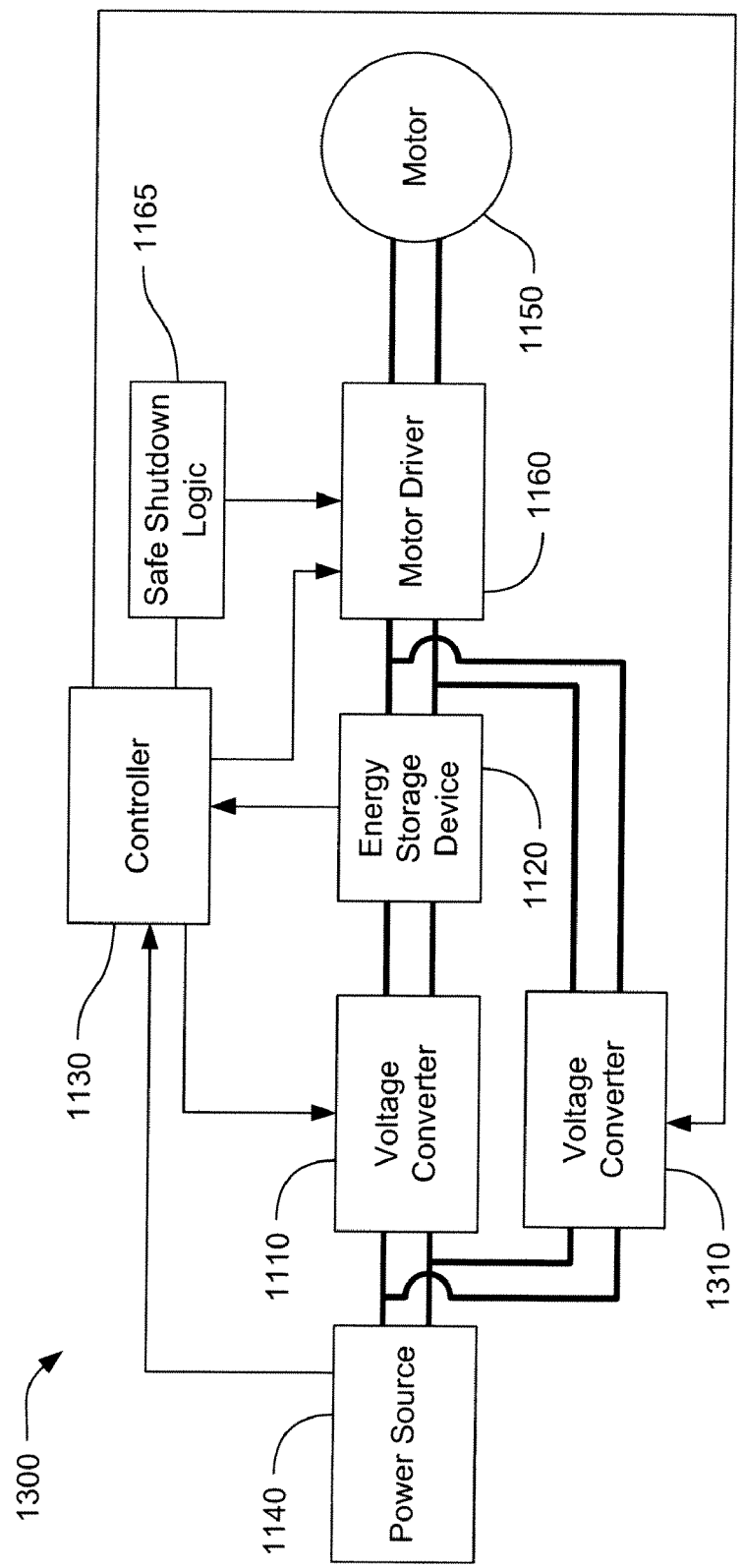
FIG. 13 is a schematic representation of a system for supplying power to a robotic system according to still another embodiment of the present invention.

Still another means for dissipating excess energy is illustrated by the system 1300 of FIG. 13. In this embodiment the power source 1140 comprises a rechargeable power source such as a rechargeable battery system, and system 1300 further comprises a second voltage converter 1310. When the charge voltage of energy storage device 1120 is close to the maximum and energy is coming back from one or more of the components, then logic of the controller 1130 controls the second voltage converter 1310 to apply an appropriate charging voltage to the power source 1140 in order to recharge the power source 1140. In some embodiments, the second voltage converter 1310 is configured to not exceed a maximum charge voltage for the power supply 1140, and can also be configured to conform to a charge current curve, to not charge the power supply 1140 when a temperature of the power supply 1140 exceeds a temperature limit, and so forth.

To extend battery cycle life, the controller 1130 can also be configured to only engage the second voltage converter 1310 to recharge the power supply 1140 when the voltage of the power source 1140 is below some threshold and/or the amount of excess energy to be dissipated exceeds some threshold. In this way the power source 1140 is not subjected to frequent and insignificant recharging events. It will be understood that in further embodiments the voltage converter 1110 and the second voltage converter 1310 can be integrated into a single device. It also be appreciated that the controller 1130, in some embodiments, includes logic configured to select a method for dissipating excess energy from the several available methods, and can also include logic to dissipate excess energy through more than one method simultaneously.

In still other embodiments, the controller 1130 includes logic configured to affect the operation of the robot in order to lower the power demand when the power demand exceeds the combined capacity of the power source 1140 and the energy storage device 1120. As noted above, if the controller 1130 determines that the robot is drawing more power than the power source 1140 in combination with the energy storage device 1120 can continuously supply, the logic of the controller 1130 can be configured to lower the maximum robot speed to a speed that will keep power consumption within the range that can be supplied by the power source 1140 with enough residual capacity to recharge the energy storage device.

In various embodiments, logic such as balance maintaining logic 430, base angle determining logic 510, position tracking logic 610, movement logic 620, control input logic 640, safe shutdown logic 1165 and the logic of the controller 1130 comprise hardware, firmware, and/or software stored on a computer readable medium, or combinations thereof. Such logic may include a computing device such as an integrated circuit, a microprocessor, a personal computer, a server, a distributed computing system, a communication device, a network device, or the like. A computer readable medium can comprise volatile and/or non-volatile memory, such as random access memory (RAM), dynamic random access memory (DRAM), static random access memory (SRAM), magnetic media, optical media, nano-media, a hard drive, a compact disk, a digital versatile disk (DVD), and/or other devices configured for storing digital or analog information. Various logic described herein also can be partially or entirely integrated together, for example, balance maintaining logic 430 and base angle determining logic 510 can comprise the same integrated circuit. Various logic can also be distributed across several computing systems.

It will be appreciated that the control of the robot 100 described above can also be configured such that the waist angle is determined from the base angle. In these embodiments the appropriate waist angle is determined, responsive to a varying base angle, and the waist angle is changed while the base angle varies to keep the robot 100 balanced and in approximately a constant location. Control systems for keeping the robot 100 balanced and maintained at an approximate location by bending at the waist joint 150 in response to a varying base angle are analogous to the control systems described above.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:
1. A robotic system comprising:
   a dynamically balancing robot including an electrically activated component that is employed when the robot is brought to a stable shutdown configuration; and
   a power system configured to power the component and including
      a voltage converter configured to receive power from a power source, an energy storage device in electrical communication between the voltage converter and the component, the energy storage device being capable of providing the component with sufficient power to bring the robot to the stable shutdown configuration during a deleterious power event, and a controller configured to monitor for an indication of the deleterious power event.

2. The robotic system of claim 1 wherein the robot dynamically balances on two wheels.

3. The robotic system of claim 1 wherein the component comprises a motor.

4. The robotic system of claim 3 further comprising a motor driver in electrical communication between the motor and the energy storage device.

5. The robotic system of claim 1 wherein the voltage converter comprises a DC to DC converter.

6. The robotic system of claim 1 further comprising a DC power source, wherein the voltage converter is in electrical communication between the DC power source and the energy storage device.

7. The robotic system of claim 1 wherein the voltage converter comprises an AC to DC converter.

8. The robotic system of claim 1 wherein the energy storage device comprises an ultracapacitor assembly.

9. The robotic system of claim 1 wherein the energy storage device is characterized by a power density of at least 1000 W/kg.

10. The robotic system of claim 1 wherein the energy storage device is characterized by an energy density of at least 1 Wh/kg.

11. The robotic system of claim 1 wherein the robot further comprises a tether including a power line coupled to the energy storage device.

12. The robotic system of claim 1 further comprising a shunt circuit, wherein the controller is further configured to dissipate excess energy through the shunt circuit.

13. The robotic system of claim 1 wherein the controller is further configured to dissipate excess energy by adding an oscillation to a drive voltage applied to a motor.

14. The robotic system of claim 1 wherein the power source comprises a DC power source and wherein the system further comprises and a second voltage converter configured to recharge the DC power source.

15. The robotic system of claim 1 wherein the controller is further configured to regulate a current and voltage applied by the voltage converter to the energy storage device.

16. The robotic system of claim 1 wherein the system further comprises safe shutdown logic configured to control the component through a series of safe shutdown steps to achieve the stable shutdown configuration.

17. The robotic system of claim 1 wherein the controller is further configured to supply power to the component from the power source and the energy storage device in parallel.

18. A method comprising:
balancing a robot on no more than two points of contact with the ground, wherein balancing the robot comprising drawing power from a power source; and responding to a deleterious power event by transitioning the robot to a stable shutdown configuration while drawing power from an ultracapacitor assembly.

19. The method of claim 18 wherein the deleterious power event comprises a loss of power.

20. The method of claim 18 wherein the deleterious power event comprises a low battery condition wherein the available power remaining in a battery system is insufficient to transition the robot to the stable shutdown configuration.

21. The method of claim 18 wherein the robot comprises a dynamically balancing robotic personal vehicle.

22. The method of claim 18 wherein the robot is configured to dynamically balance on two legs.

23. The method of claim 18 further comprising monitoring the power source for an indication of the deleterious power event.

24. A method comprising:
balancing a robot on no more than two points of contact with the ground, including drawing power from a power source characterized by a safe discharge rate, the robot including an ultracapacitor assembly characterized by a maximum charge voltage; and drawing power in parallel from both the power source and from the ultracapacitor assembly, where the power drawn from the power source is limited by the safe discharge rate where power drawn responding to a deleterious power event transitions the robot to a stable shutdown configuration while drawing power from the ultracapacitor assembly.

25. The method of claim 24 further comprising monitoring the charge voltage of the ultracapacitor assembly.

26. The method of claim 25 further comprising modifying an operational limit of the robot responsive to the charge voltage of the ultracapacitor assembly.

27. The method of claim 26 wherein the operational limit of the robot comprises a maximum speed.

* * * * *